(12) United States Patent
Yamada

(10) Patent No.: US 11,842,006 B2
(45) Date of Patent: Dec. 12, 2023

(54) INFORMATION PROCESSING APPARATUS

(71) Applicant: CANON KABUSHIKI KAISHA, Tokyo (JP)

(72) Inventor: Ryohei Yamada, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/576,743

(22) Filed: Jan. 14, 2022

(65) Prior Publication Data
US 2022/0236851 A1    Jul. 28, 2022

(30) Foreign Application Priority Data
Jan. 22, 2021   (JP) ................... 2021-009131

(51) Int. Cl.
| G06F 3/041 | (2006.01) |
| G06F 3/042 | (2006.01) |
| G06F 3/044 | (2006.01) |
| G06F 9/54  | (2006.01) |

(52) U.S. Cl.
CPC .......... *G06F 3/04166* (2019.05); *G06F 3/044* (2013.01); *G06F 3/0421* (2013.01); *G06F 9/542* (2013.01)

(58) Field of Classification Search
CPC .... G06F 3/04166; G06F 3/0421; G06F 3/044; G06F 9/542; G06F 3/0482; G06F 3/04842; G06F 3/0488; G06F 3/0412; G06F 3/0446
See application file for complete search history.

(56) References Cited

U.S. PATENT DOCUMENTS

| | | | | |
|---|---|---|---|---|
| 2002/0196238 A1* | 12/2002 | Tsukada | ................ | G06F 3/0482 345/173 |
| 2008/0278450 A1* | 11/2008 | Lashina | ................ | G06F 3/0488 345/173 |
| 2013/0106775 A1* | 5/2013  | Yoo     | .....................| G06F 3/04166 345/173 |
| 2016/0132122 A1* | 5/2016  | Steinle | ....................| G06F 3/017 345/173 |
| 2016/0202840 A1* | 7/2016  | Ichihara| ................ | G06F 3/0488 345/174 |
| 2018/0042685 A1* | 2/2018  | Marbach | ................ | A61B 34/25 |
| 2020/0319750 A1* | 10/2020 | Murayama| .......... | G06F 3/04845 |
| 2020/0319791 A1* | 10/2020 | Murayama| ............ | G06F 3/0481 |
| 2021/0052756 A1* | 2/2021  | Kim     | .................... | F21V 33/0052 |
| 2021/0165987 A1* | 6/2021  | Kim     | .................... | G06F 3/04166 |

FOREIGN PATENT DOCUMENTS

| JP | 2016-062410 A | 4/2016 |
| JP | 2016-520906 A | 7/2016 |

\* cited by examiner

*Primary Examiner* — Hong Zhou
(74) *Attorney, Agent, or Firm* — Canon U.S.A., Inc. IP Division

(57) ABSTRACT

An apparatus includes an operation unit configured to detect a position of an object being present perpendicular to a screen and receive, in a case where the position of the object being present perpendicular to the screen satisfies a first condition, a non-contact input based on the position of the object, wherein, in a case where the position of the object being present perpendicular to the screen satisfies a second condition of being present closer to the screen than a position specified in the first condition, the operation unit issues a warning without prohibiting an input based on the position of the object.

16 Claims, 16 Drawing Sheets

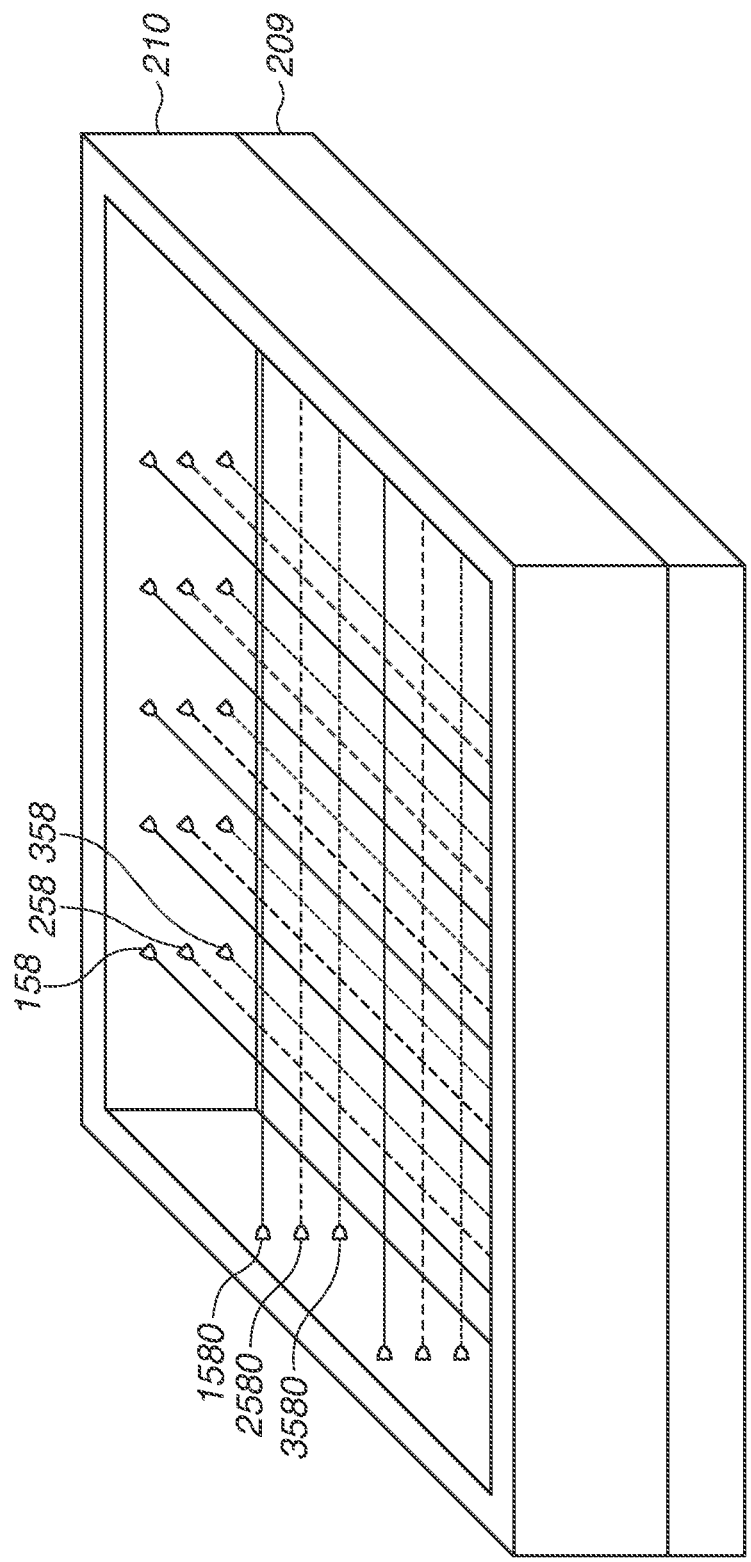

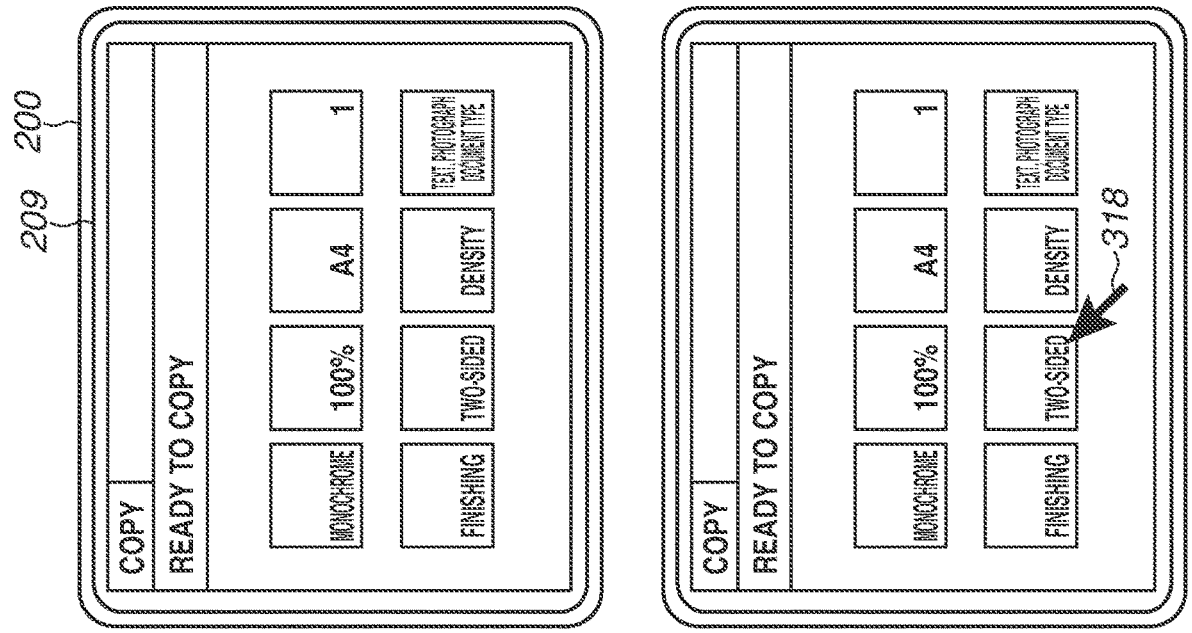
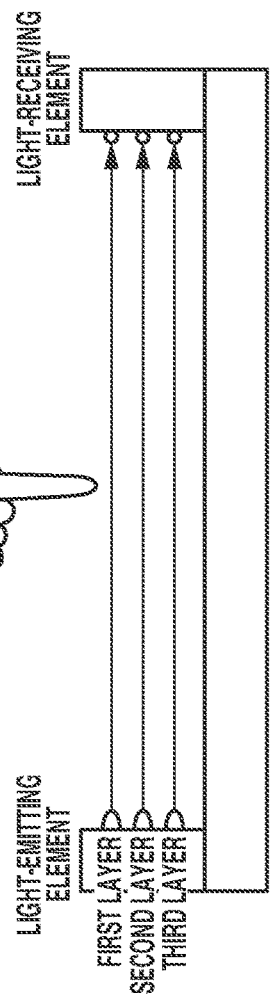
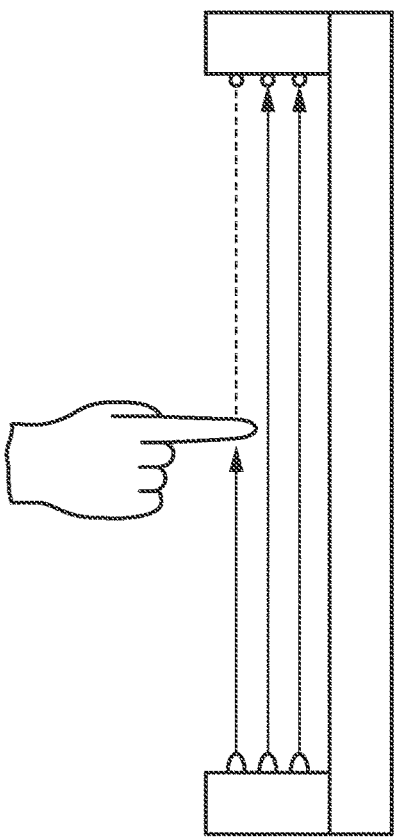

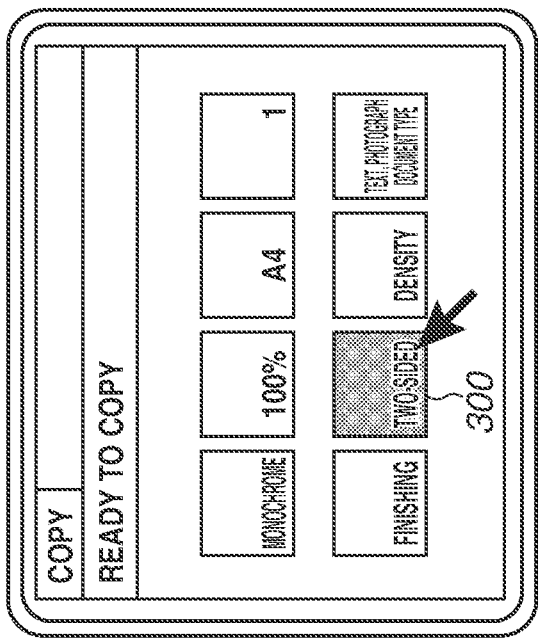
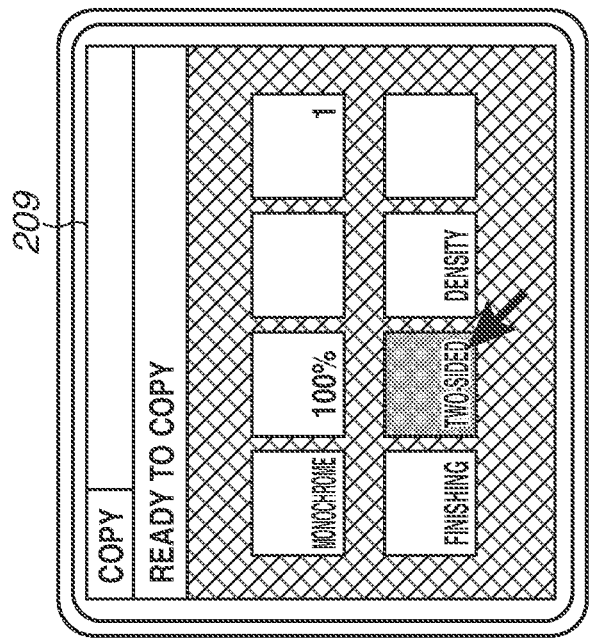
FIG.6C
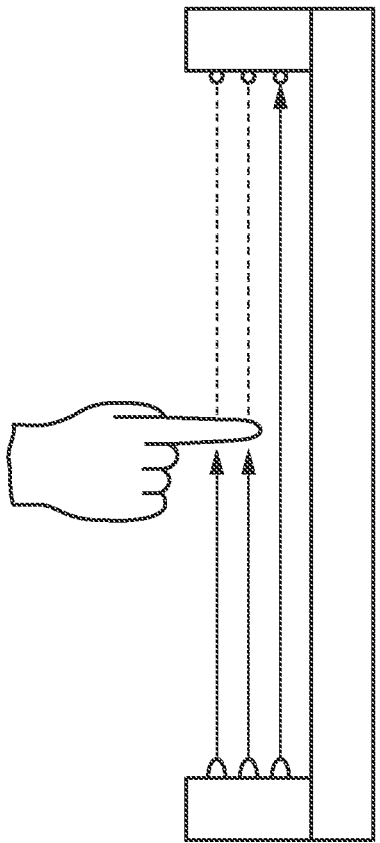
FIG.6D
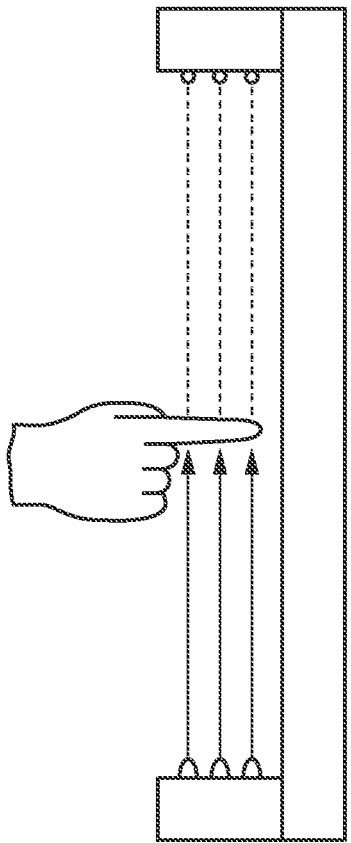

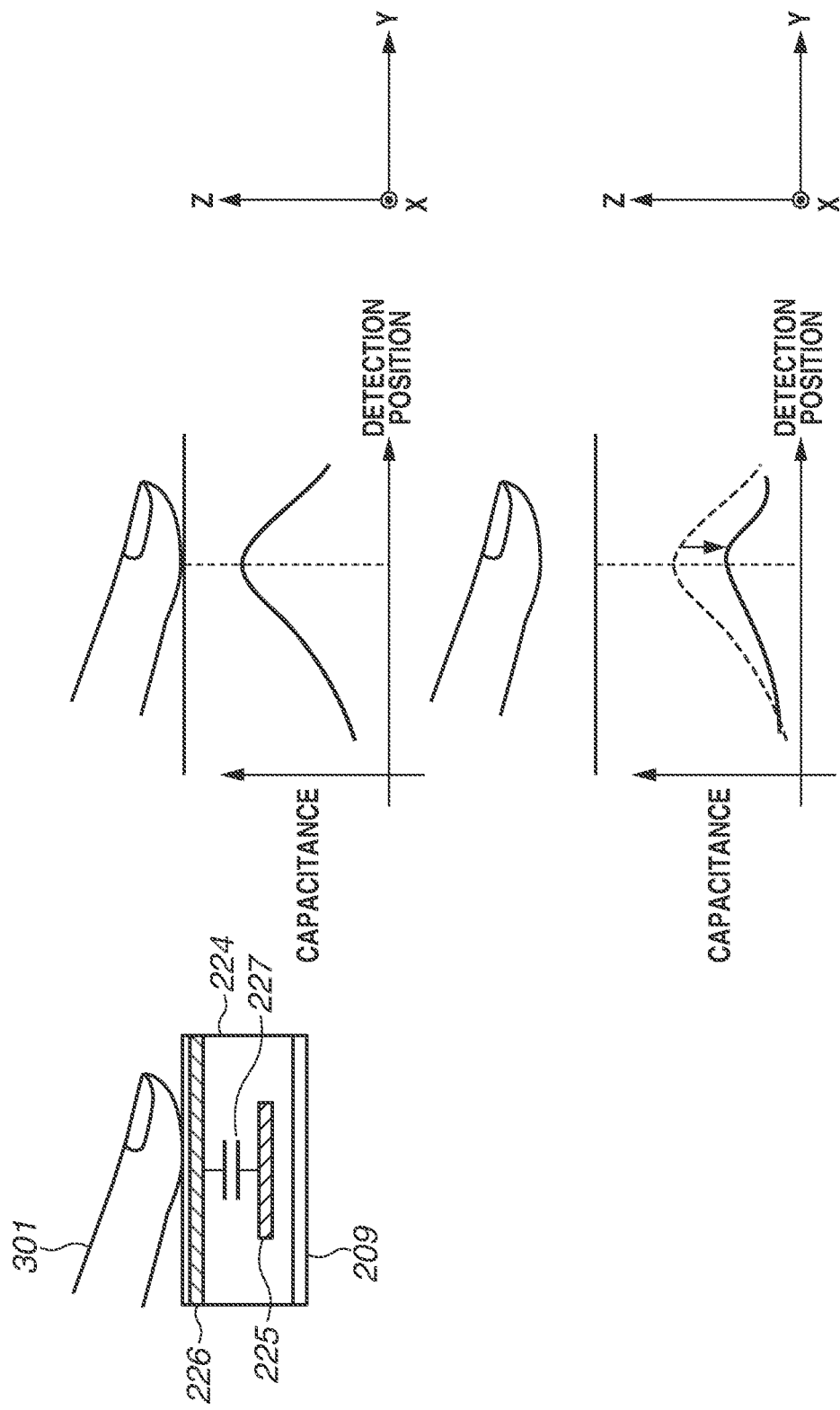

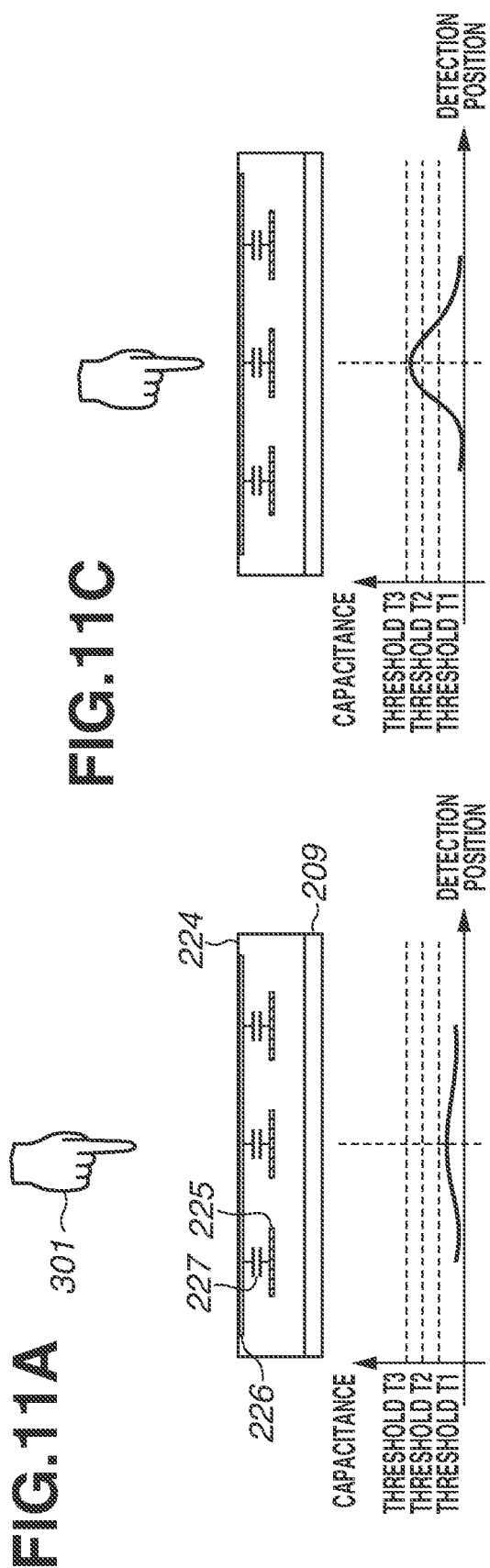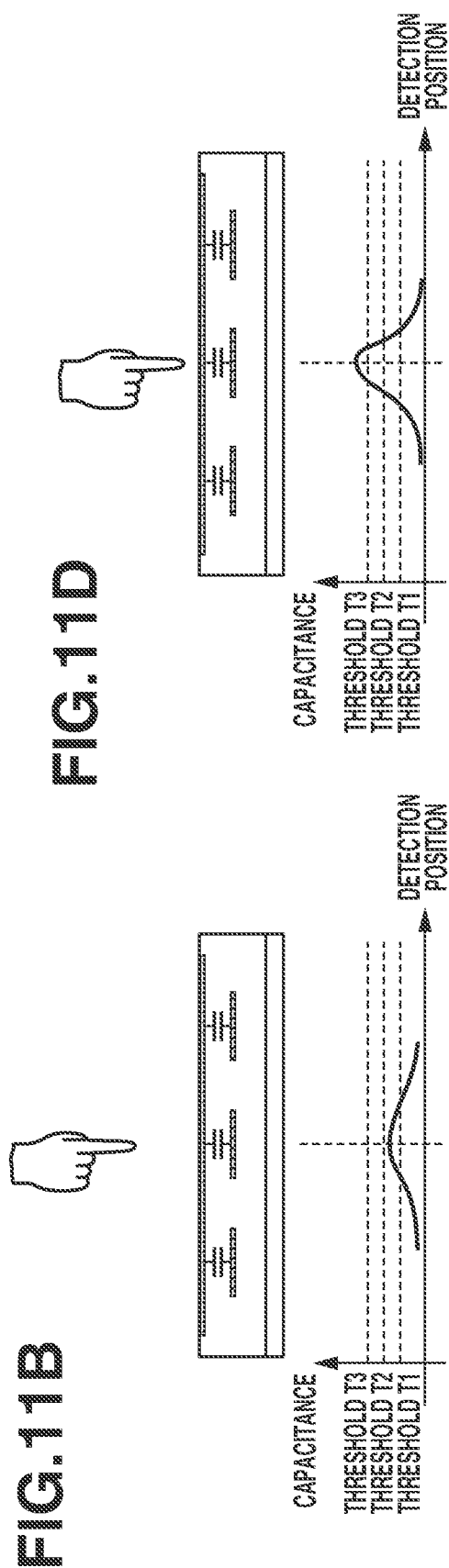

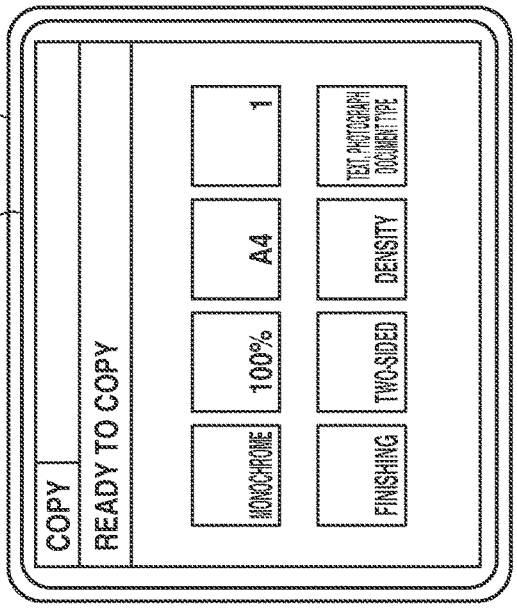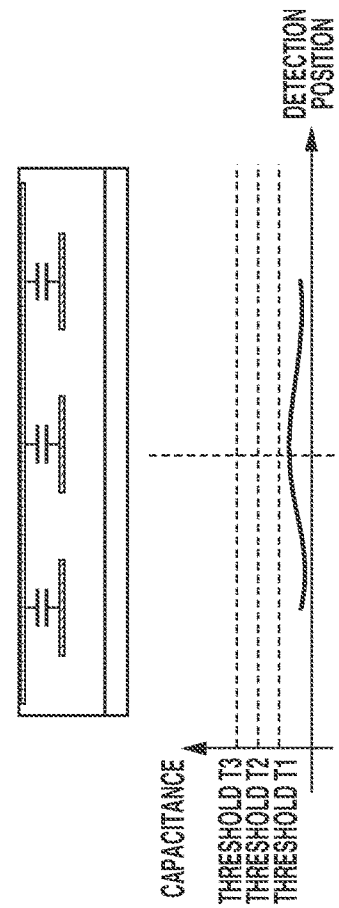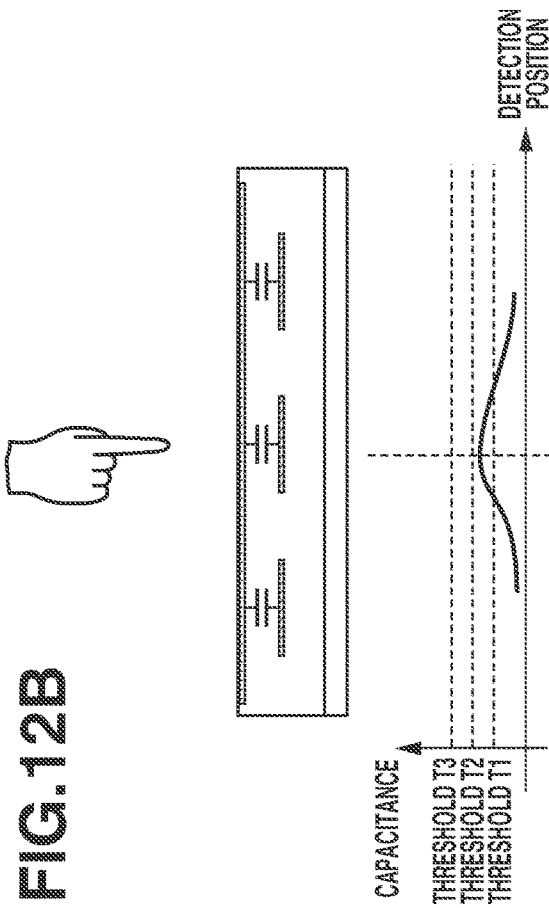

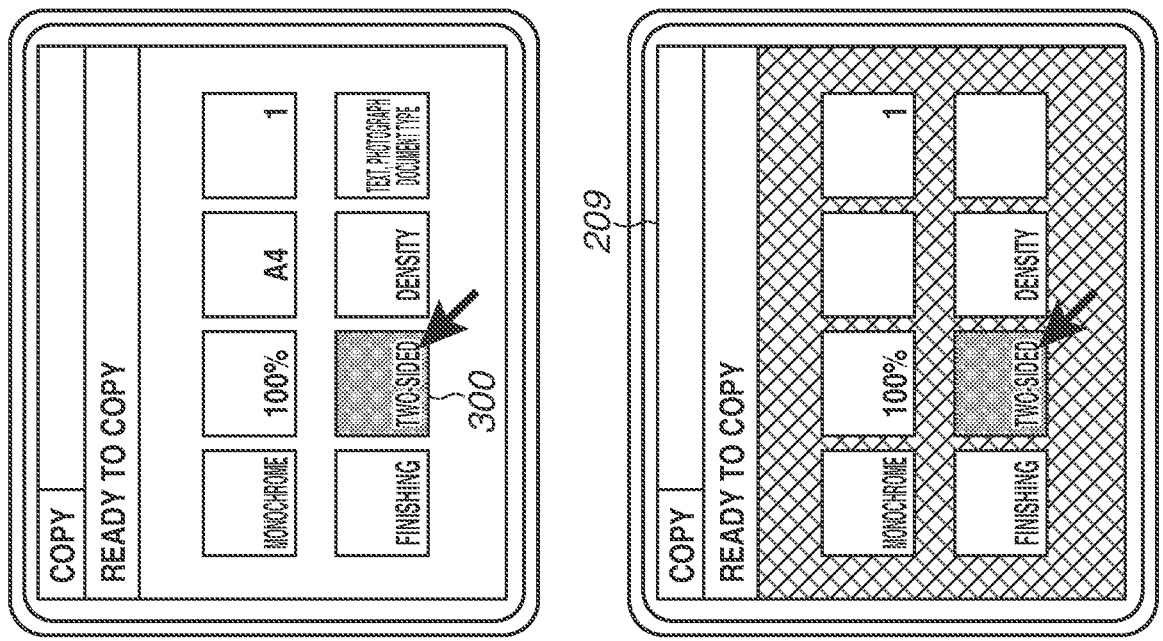
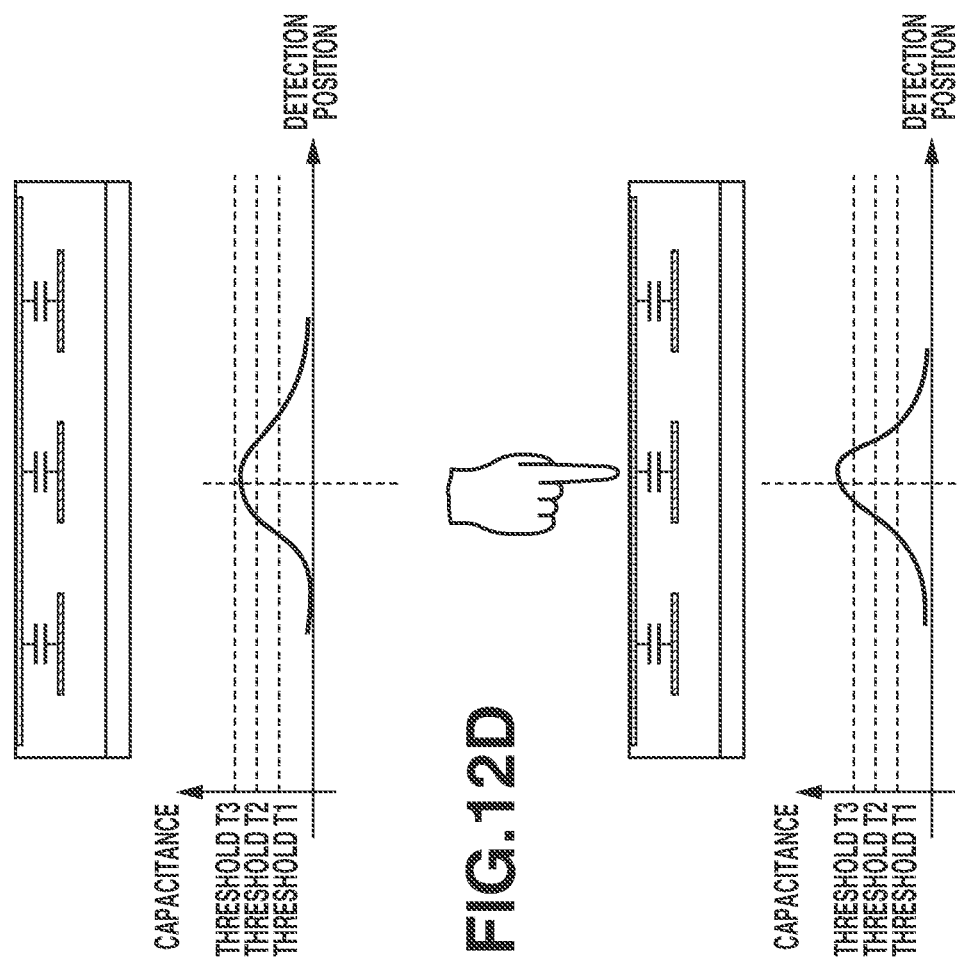

INFORMATION PROCESSING APPARATUS

BACKGROUND

Field

The present disclosure relates to an information processing apparatus.

Description of the Related Art

Because of improvements in transportation of people and goods, new viruses and mutant viruses can be rapidly spread all over the world, and large outbreaks of new viruses and mutant viruses have been frequently occurring. After many studies, it has been found that many of these infectious diseases are transmitted to people through intake of viruses contained in droplets exhaled from infected persons. Among the studies, some results show that such viruses can remain infective for several days on glass surfaces or plastic surfaces. In order to prevent people from being in contact with viruses as much as possible, various goods and devices usable or operable in a non-contact state are growing in demand.

The same can also be said for electric devices that are used by an unspecified large number of users. Electric devices which receive an input by a user's contact operation also need to be changed to non-contact operation supported devices to meet the demand for safer devices. Examples of such electric devices that need to be changed include a multifunction peripheral (MFP) serving as an image forming apparatus, which is used by many users and includes a contact-type touch panel display for receiving user touch operations.

As an example of a non-contact operation supported device, Japanese Patent Application Laid-Open No. 2016-062410 discusses an image forming apparatus including a capacitance-type touch panel that has detection areas including an area R1 defined separate from the touch panel and an area R2 defined farther separate from the touch panel than the area R1. A position of a user's finger is determined in the area R2, and a user's selection is determined in the area R1. With this configuration, the image forming apparatus can support functions for receiving an operation for searching a desired button and an operation for issuing an instruction which are performed by a user in a non-contact operation state. As another example, Japanese Unexamined Patent Application Publication (Translation of PCT Application) No. 2016-520906 discusses an infrared-type display including a non-contact touch panel which supports a non-contact multi-touch operation on the infrared-type display.

SUMMARY

According to various embodiments of the present disclosure, an apparatus is provided that includes an operation unit configured to detect a position of an object being present perpendicular to a screen and receive, in a case where the position of the object being present perpendicular to the screen satisfies a first condition, a non-contact input based on the position of the object, wherein, in a case where the position of the object being present perpendicular to the screen satisfies a second condition of being present closer to the screen than a position specified in the first condition, the operation unit issues a warning without prohibiting an input based on the position of the object.

Further features of the present disclosure will become apparent from the following description of example embodiments with reference to the attached drawings.

BRIEF DESCRIPTION OF THE DRAWINGS

FIG. 4 is a configuration diagram illustrating an infrared-type touch panel on which non-contact sensors are arranged in three layers according to one embodiment.

FIGS. 6A to 6D are diagrams illustrating the infrared-type touch panel on which non-contact sensors are arranged in three layers, each of which illustrates contents of information displayed on a display unit when a physical object intercepts a non-visible light beam according to one embodiment.

FIG. 10 is a diagram illustrating increase and decrease of capacitance of a sensor element when a physical object moves close to the capacitance-type touch panel according to one embodiment.

FIGS. 11A to 11D are diagrams illustrating increase and decrease of capacitance of a sensor element and thresholds thereof when a physical object moves close to the capacitance-type touch panel according to one embodiment.

FIGS. 12A to 12D are diagrams illustrating the capacitance-type touch panel, each of which illustrates contents of information displayed on the display unit when capacitance exceeds a threshold according to one embodiment.

DESCRIPTION OF THE EMBODIMENTS

Example embodiments of the present disclosure will be described in detail with reference to the appended drawings. The example embodiments described hereinafter are not intended to limit the scope of the present invention, and not all of the combinations of features described in the example embodiments are required as the solutions of the present invention. In the present example embodiments, while an image forming apparatus will be described as an example of an information processing apparatus, the present invention is not limited thereto.

Hereinafter, a first example embodiment embodying various embodiments of the present disclosure will be described with reference to the drawings.

Figure 14:
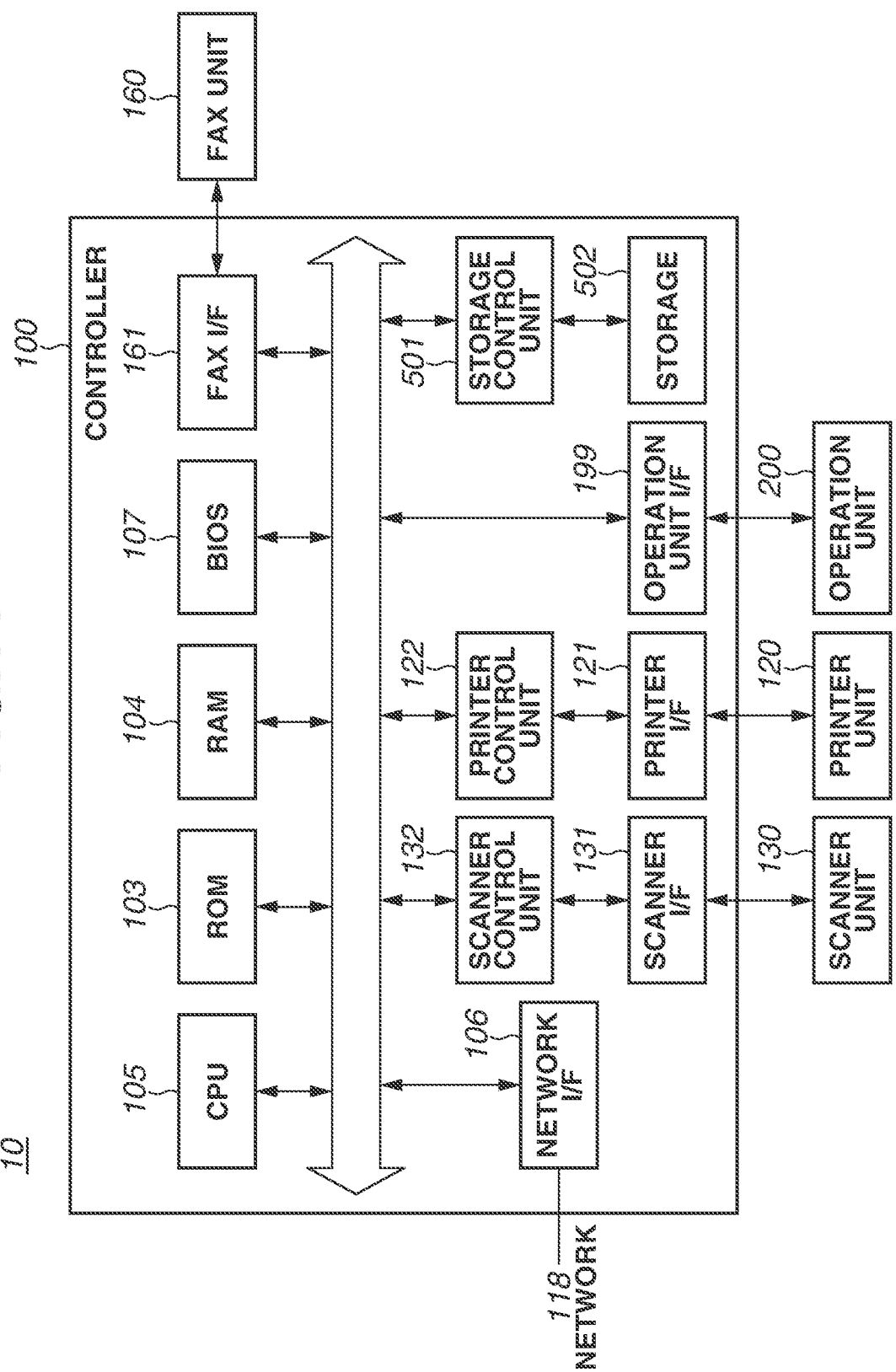
FIG. 14 is a block diagram of an image forming apparatus according to one embodiment.

FIG. 14 is a block diagram of an image forming apparatus 10 according to the present example embodiment.

A central processing unit (CPU) 105 executes a software program stored in a random access memory (RAM) 104 to control the entire image forming apparatus 10.

For example, a read only memory (ROM) 103 stores a program for starting a controller 100, a program for executing image formation, and fixed parameters.

The RAM 104 is used for storing a program and temporary data when the CPU 105 controls the image forming apparatus 10. The program and temporary data stored in the RAM 104 are a program and data read from the ROM 103 and a storage 502 described below.

A basic input/output system (BIOS) 107 is a non-volatile memory storing a boot program (BIOS). When printing processing is executed via a printer interface (I/F) 121, a printer control unit 122 communicates with the CPU 105 to receive setting information set by a user, and controls operation of a printer unit 120 based on the setting information.

When scanning processing is executed via a scanner I/F 131, a scanner control unit 132 communicates with the CPU 105 to receive setting information set by a user, and controls operation of a scanner unit 130 based on the setting information.

A network I/F 106 transmits and receives data via a network 118. Specifically, the network I/F 106 receives data transmitted via the network 118, and transmits image data read by the scanner unit 130 or stored in the storage 502 to a predetermined address via the network 118.

A fax I/F 161 can transmit and receive a digital image to/from a phone line via a fax unit 160. Specifically, the fax I/F 161 receives image data transmitted from the phone line via the fax unit 160. Further, the fax I/F 161 transmits image data read by the scanner unit 130 or stored in the storage 502 to a predetermined address via the fax unit 160 and the phone line.

The storage 502 serves as a main storage to store a program to be executed by the CPU 105, a program management table, and various types of data. The program to be executed by the CPU 105 is a boot program which is executed by the CPU 105 to boot an operating system (OS) when the image forming apparatus 10 is started.

Examples of the storage 502 include a hard disk drive (HDD), a solid state drive (SSD), an embedded multimedia card (eMMC), a NAND flash memory, and a NOR flash memory. The storage 502 stores therein information on whether an input method of an operation unit 200 is set to a non-contact input method or a contact input method, in association with a user when the user logs in the image forming apparatus 10.

The controller 100 is connected to the operation unit 200 via an operation unit I/F 199. The operation unit 200 and behavior of a user at the time of log-in to the image forming apparatus 10 will be described below in detail.

Figure 1:
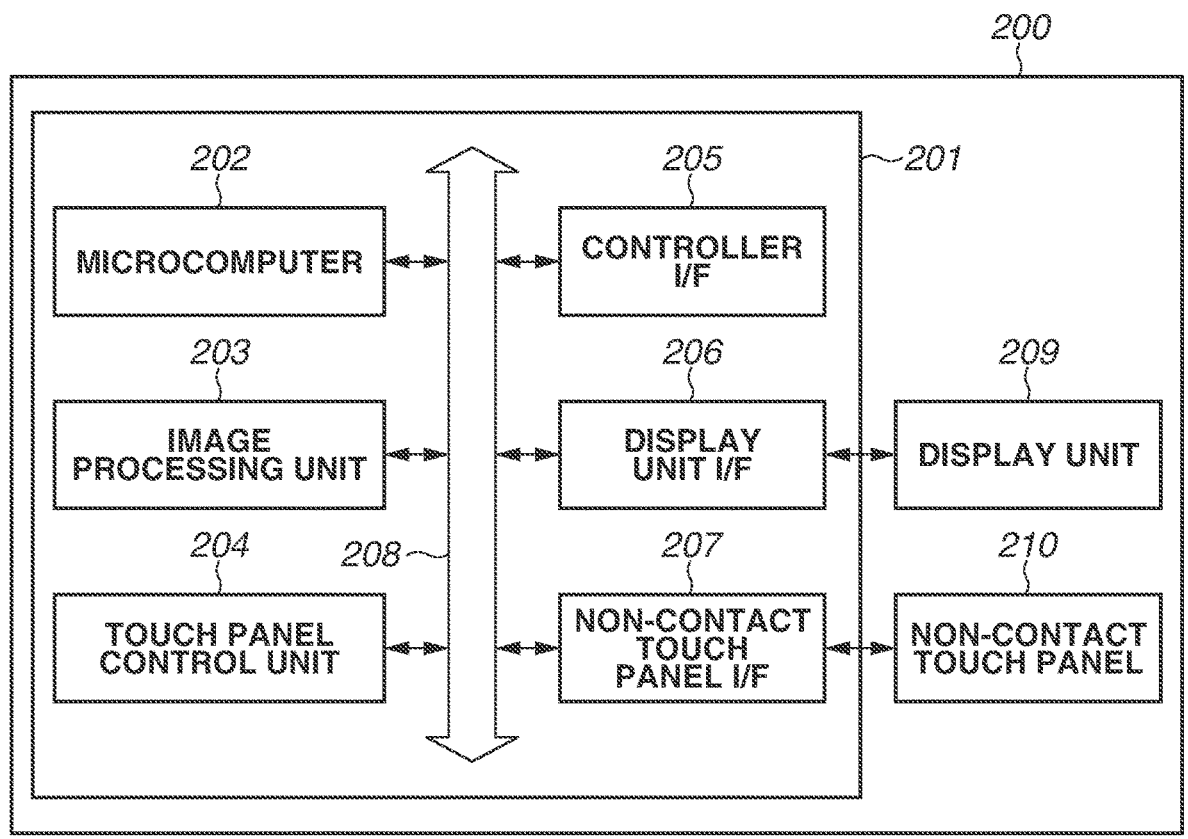
FIG. 1 is a block diagram illustrating a configuration of an operation unit including a non-contact touch panel according to one embodiment.

FIG. 1 is a block diagram illustrating an example of a hardware configuration of the operation unit 200 including a non-contact touch panel.

The information processing apparatus according to the present example embodiment will be described by taking an image forming apparatus including an operation unit as an example.

The operation unit 200 includes a control substrate 201, a display unit 209, and a non-contact touch panel 210. An image processing unit 203 generates image data to be displayed on the display unit 209 and transmits the image data to the display unit 209 via a display unit I/F 206. A touch panel control unit 204 acquires coordinate data from the non-contact touch panel 210 via a non-contact touch panel I/F 207. Then, a microcomputer 202 acquires information from the touch panel control unit 204 and communicates with the controller via a controller I/F 205 and the operation unit I/F 199 based on the acquired information.

The controller is a device which communicates with the operation unit 200. The controller I/F 205 is connected to the controller, and is also connected to respective units via a system bus 208. The non-contact touch panel 210 is disposed over the top of the display unit 209. The non-contact touch panel 210 receives an input when a user selects an operation key displayed on the display unit 209. Examples of types of the non-contact touch panel 210 include an optical type and an ultrasonic type. Consequently, a type of the non-contact touch panel OF 207 is a type corresponding to the type used for the non-contact touch panel 210. In the example embodiments according to the present disclosure, an infrared type and a capacitance type are used for the non-contact touch panel 210.

Figure 2:
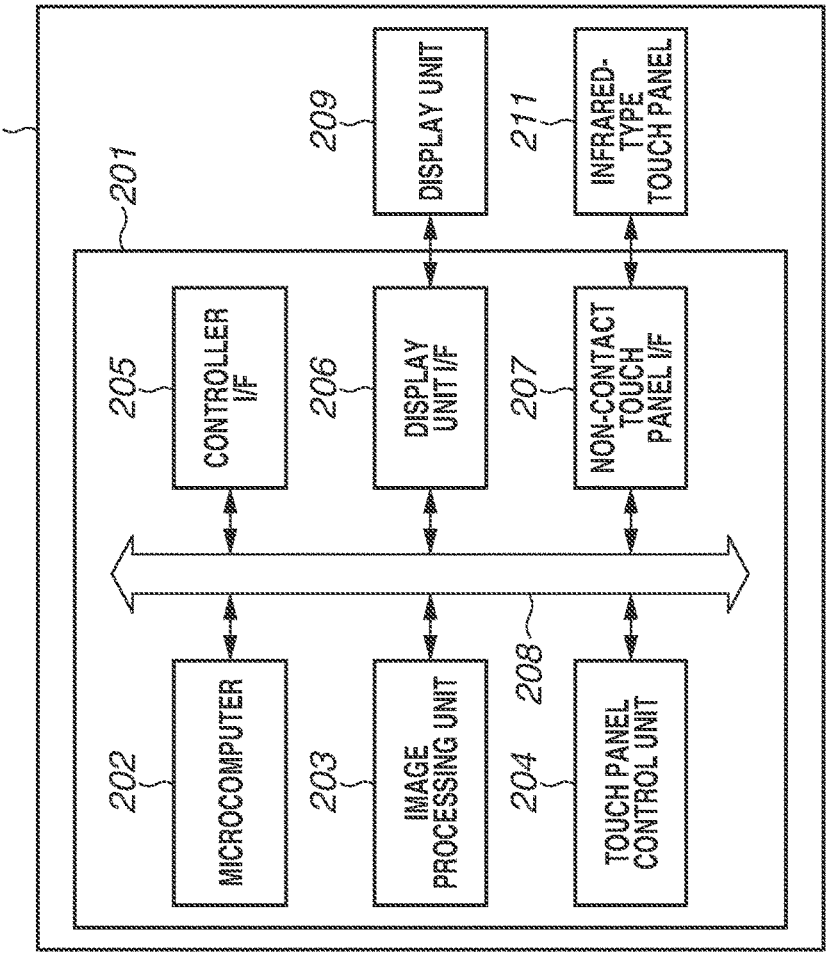
FIG. 2A is a block diagram illustrating a configuration of an operation unit including an infrared-type touch panel according to one embodiment.
FIG. 2B is a block diagram of the infrared-type touch panel according to one embodiment.

A description will be given of a case where an infrared-type touch panel is used as the non-contact touch panel 210. FIG. 2A is a block diagram illustrating an example of a hardware configuration of an operation unit including an infrared-type touch panel 211.

An operation unit 200 includes a control substrate 201, a display unit 209, and an infrared-type touch panel 211. An image processing unit 203 generates image data to be displayed on the display unit 209 and transmits the image data to the display unit 209 via a display unit OF 206. A touch panel control unit 204 acquires coordinate data from the infrared-type touch panel 211 and communicates with a controller via a controller OF 205. The controller is a device which communicates with the operation unit 200.

The controller OF 205 is connected to the controller, and is also connected to each of the units via a system bus 208. The infrared-type touch panel 211 is disposed over the top of the display unit 209. The infrared-type touch panel 211 receives an input when a user selects an operation key displayed on the display unit 209.

FIG. 2B is a block diagram of the infrared-type touch panel 211. The infrared-type touch panel 211 includes a control unit 212, a light-emitting element 158, and a light-receiving element 159. The control unit 212 includes a detection unit 213, a determination unit 214, and a memory unit 215.

The detection unit 213 controls the light-emitting element 158 and the light-receiving element 159 based on a determination result acquired by the determination unit 214. According to an instruction from the determination unit 214, the detection unit 213 switches an ON/OFF state of the light-emitting element 158. The ON/OFF state of the light-emitting element 158 is switched by, for example, control of supplying driving power to the light-emitting element 158.

The detection unit 213 detects received-light intensity of a light beam input to the light-receiving element 159 and transmits the detected received-light intensity to the control unit 212. The control unit 212 transmits the received-light intensity received from the detection unit 213 to the determination unit 214. According to an instruction from the determination unit 214, the detection unit 213 switches an ON/OFF state of the light-receiving element 159. The ON/OFF state of the light-receiving element 159 is switched in the same way as the switching in the light-emitting element 158.

The determination unit 214 stores the received-light intensity, of the light beam input to the light-receiving element 159, received from the detection unit 213 in the memory unit 215. In the memory unit 215, coordinates of the light-receiving element 159 and reference value data describing received-light intensity are stored. Based on the coordinates of the light-receiving element 159 and the reference value data stored in the memory unit 215, the determination unit 214 executes determination of whether to display a pointer, whether a touch operation is performed, and whether to issue a warning. The determination unit 214 transmits information about coordinates and reference value data of the light-receiving element 159 at which the received-light intensity is changed, to the control substrate 201 via the non-contact touch panel OF 207. The light-emitting element 158 is configured of, for example, a plurality of infrared light-emitting diodes (LEDs) and disposed along a periphery of the display unit 209 (see FIG. 3).

The light-emitting element 158 emits an inspection light beam according to an instruction from the detection unit 213. The inspection light beam emitted from the light-emitting element 158 is diffracted, intercepted, or reflected by a physical object 301. The light-receiving element 159 is configured of, for example, a plurality of photodiodes and disposed along the periphery of the display unit 209 (see FIG. 3). The light-receiving element 159 transmits received-light intensity to the detection unit 213.

Figure 3:
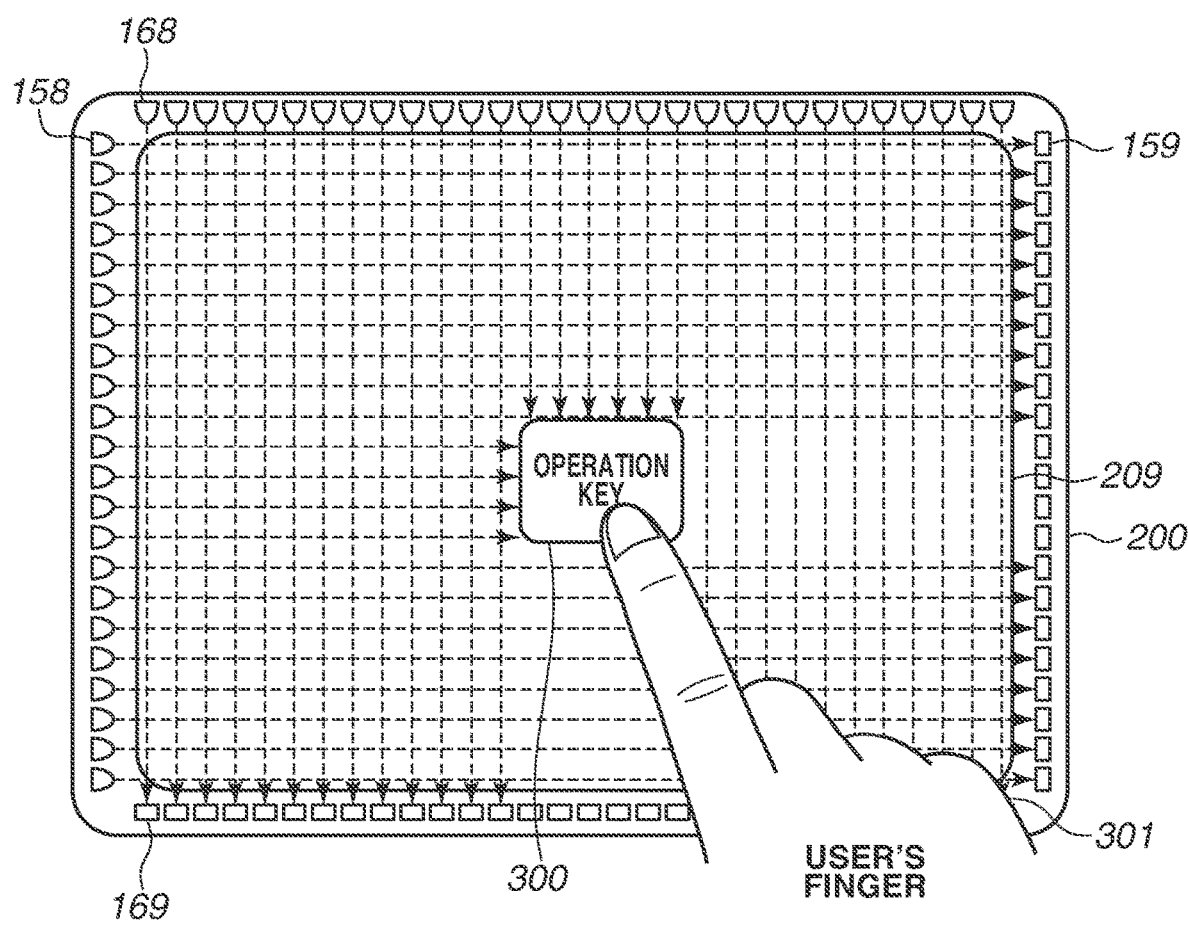
FIG. 3 is an overhead view illustrating a state where a user intercepts a non-visible light beam with a physical object to select an operation key from an infrared-type touch panel according to one embodiment.

FIG. 3 is a diagram illustrating a state where a user selects an operation key 300 displayed on the display unit 209 on which the infrared-type touch panel 211 is disposed. On an outer frame of the infrared-type touch panel 211, a plurality of infrared LEDs, or the like, including light-emitting elements 158 and 168 and a plurality of photodiodes, or the like, including light-receiving elements 159 and 169 are disposed in such a manner that each of the infrared LEDs faces a different one of the photodiodes. With this configuration, when a user's finger as the physical object 301 moves toward the operation key 300, the physical object 301 is detected.

In the example illustrated in FIG. 3, the light-emitting elements 158 and the light-receiving elements 159 are disposed in an lateral direction which is an X-direction, and the light-emitting elements 168 and the light-receiving elements 169 are arranged in a longitudinal direction which is a Y-direction. An area where the operation key 300 is disposed is a touch detection area. Examples of the operation key 300 include a power saving key, a home button, a copy start key, a stop key, a color setting key, and a sheet size key. When an invisible light beam, such as an infrared light beam, emitted from the light-emitting element 158 to the light-receiving element 159 is intercepted by the physical object (object) 301, such as a user's finger, the control substrate 201 detects corresponding coordinates. The display unit 209 outputs image data transmitted from the control substrate 201.

With reference to FIG. 4, a description will be given of a case where the infrared-type touch panel 211 disposed on top of the operation unit 200 of the image forming apparatus 10 has a configuration in which light-emitting elements and light-receiving elements for detecting interception of invisible light beams caused by the physical object 301 are disposed in three layers in a perpendicular direction which is a Z-direction, i.e., disposed in three rows in the Z-direction.

For example, light-emitting elements 158 and 1580 are disposed on a first layer in the X-direction and the Y-direction, respectively. Light-emitting elements 258 and 2580 are disposed on a second layer in the X-direction and the Y-direction, respectively. Light-emitting elements 358 and 3580 are disposed on a third layer in the X-direction and the Y-direction, respectively. Each of the light-emitting elements is paired with a light-receiving element disposed at a position facing with a corresponding one of the light-emitting elements. The light-receiving elements transmit received-light intensity of received light beams to the control unit 212.

With reference to FIGS. 5A to 5D, a description will be given of operation relating to displaying of a pointer, determination of a touch operation, and issuance of a warning, which is executed in a case where interception of infrared light beams occurs in the infrared-type touch panel 211. The description will be given of operation in the X-direction and the Z-direction.

Figure 5A:
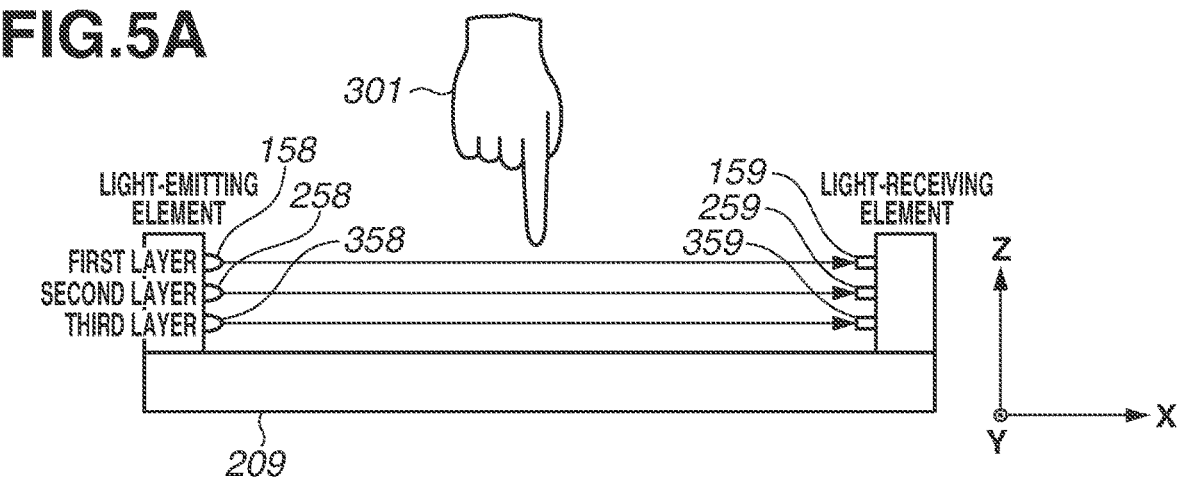
FIGS. 5A to 5D are diagrams illustrating an infrared-type touch panel on which non-contact sensors are arranged in three layers, each of which illustrates a state where a physical object intercepts a non-visible light beam at each layer according to one embodiment.
Figure 5B:
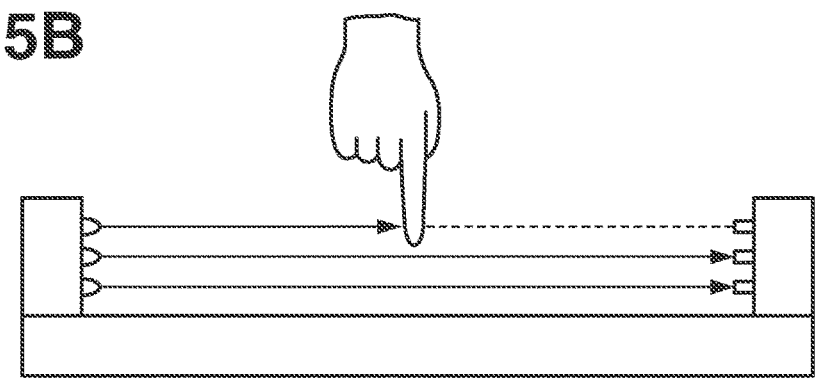

The light-emitting elements 158, 258, and 358, and the light-receiving elements 159, 259, and 359 are disposed in the Z-direction. For example, as illustrated in FIG. 5B, in a case where a finger as the physical object 301 intercepts an invisible light beam emitted from the light-emitting element 158 to the light-receiving element 159 on the first layer, the control unit 212 detects interception of the invisible light beam based on received-light intensity transmitted from the light-receiving element 159. The determination unit 214 stores the received-light intensity transmitted from the light-receiving element 159 via the detection unit 213 in the memory unit 215. Based on the stored coordinates, the determination unit 214 determines that the first layer is intercepted, and transmits a notification to prompt the control substrate 201. The touch panel control unit 204 receives the notification and instructs the display unit 209 to display a pointer on a point corresponding to the coordinates.

Figure 5C:
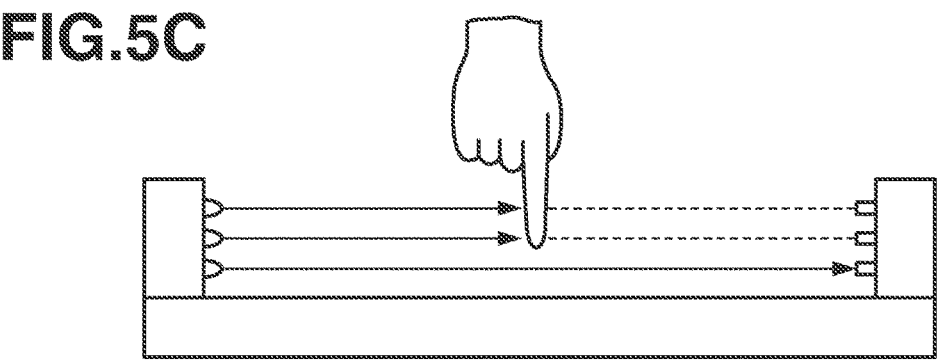

Next, as illustrated in FIG. 5C, in a case where the finger intercepts an invisible light beam emitted from the light-emitting element 258 to the light-receiving element 259 on the second layer, the control unit 212 executes processing similar to the processing with respect to the light-receiving element 159. The determination unit 214 determines that the second layer is intercepted at the stored coordinates, and transmits a notification to prompt the control substrate 201 to execute operation in response to a touch operation performed on a point corresponding to the coordinates on which the pointer is displayed. The microcomputer 202 receives the notification via the touch panel control unit 204 and executes operation in response to the touch. Alternatively, in a case where, in addition to the interception of the invisible light beam emitted to the light-receiving element 159, the invisible light beam emitted to the light-receiving element 259 is also intercepted, the determination unit 214 may determine that the second layer is intercepted at the stored coordinates.

Figure 5D:
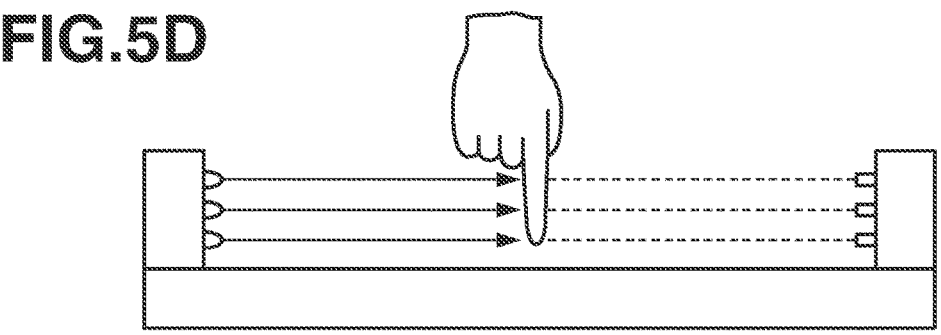

Next, as illustrated in FIG. 5D, in a case where the finger intercepts an invisible light beam emitted from the light-emitting element 358 to the light-receiving element 359 on the third layer, the control unit 212 executes processing similar to the processing performed in response to the interceptions in the light-receiving elements 159 and 259. In a case where the determination unit 214 determines that the third layer is intercepted at stored coordinates, the determination unit 214 transmits a notification to prompt the control substrate 201 to issue a warning. The touch panel control unit 204 receives the notification, and instructs the display unit 209 to display a warning color and a warning message for preventing the user from touching the touch panel, and instructs the microcomputer 202 to output a warning sound. Alternatively, in a case where, in addition to the interceptions of the invisible light beams emitted to the light-receiving elements 159 and 259, the invisible light beam emitted to the light-receiving element 359 is also intercepted, the determination unit 214 may determine that the third layer is intercepted at the stored coordinates.

With reference to FIGS. 6A to 6D, a description will be given of operation relating to displaying of a pointer, determination of a touch operation, and issuance of a warning, which are executed by the display unit 209 in synchronization with interception of an infrared light beam in the infrared-type touch panel 211.

FIG. 6A illustrates a state where the physical object 301 does not intercept an invisible light beam. For example, the display unit 209 displays a copy screen.

FIG. 6B illustrates a state where the finger as the physical object 301 intercepts the invisible light beam emitted from the light-emitting element 158 to the light-receiving element 159 on the first layer. The display unit displays a pointer 318, and the pointer 318 is moved according to a point corresponding to coordinates where the interception occurs. The pointer 318 may be displayed in a state illustrated in FIG. 6A. In this case, in FIG. 6A, the pointer 318 is not moved.

FIG. 6C illustrates a state where the finger intercepts the invisible light beam emitted from the light-emitting element 258 to the light-receiving element 259 on the second layer. The display unit 209 displays that a touch operation is performed on the operation key 300 on which the pointer 318 is displayed, by inverting color of the operation key 300, for example.

FIG. 6D illustrates a state where the finger intercepts the invisible light beam emitted from the light-emitting element 358 to the light-receiving element 359 on the third layer. The display unit 209 changes a background color to another color, e.g., red color, different from a standard color and displays a warning message stating that the physical object 301 moves close to the touch panel, and the operation unit 200 outputs a warning sound. By issuing these warnings, it is possible to warn the user not to touch the touch panel. The warnings may be issued in combination with each other.

Figure 7:
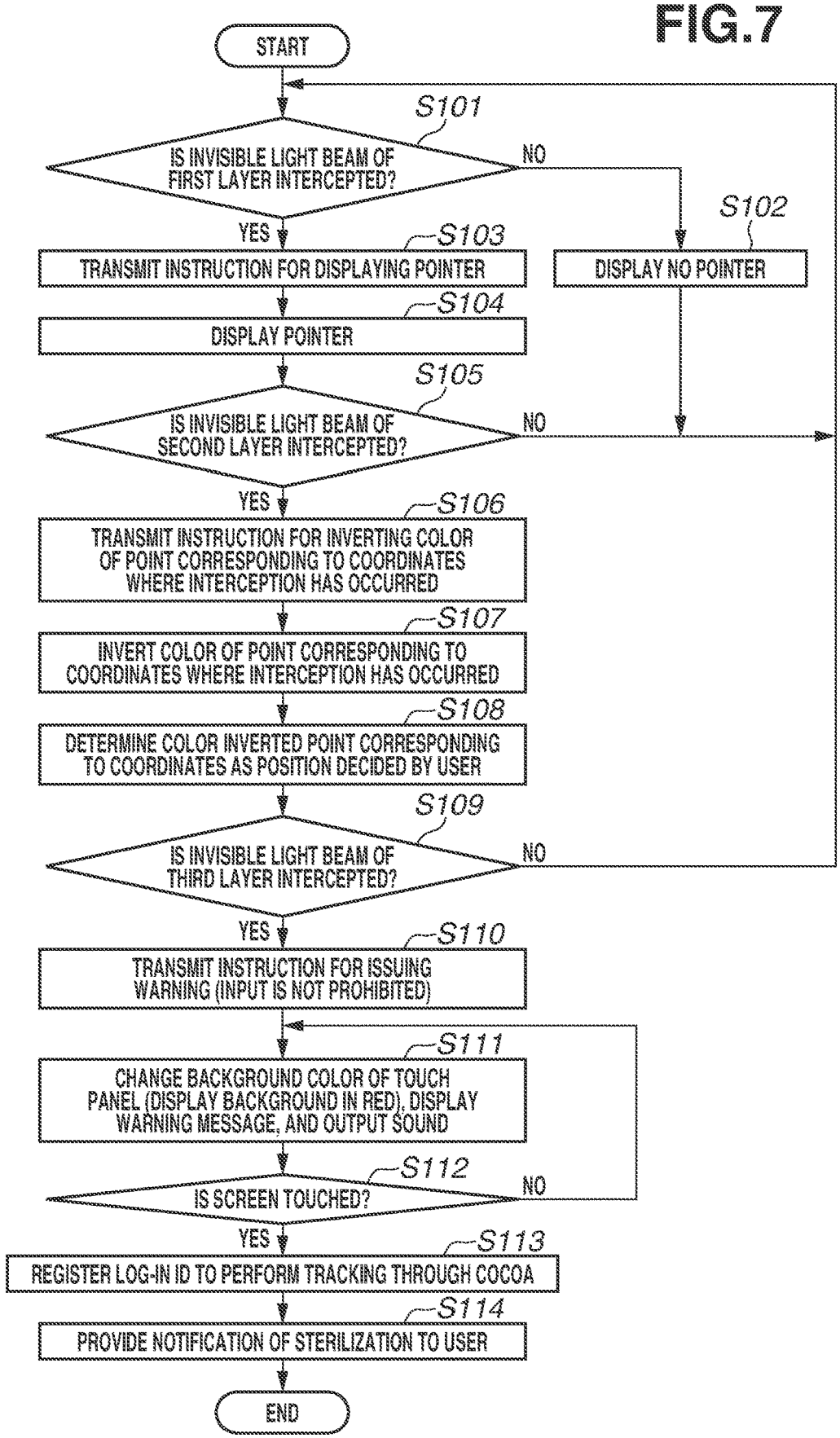
FIG. 7 is a flowchart illustrating processing to be executed when the infrared-type touch panel includes non-contact sensors arranged in three layers according to one embodiment.

FIG. 7 is a flowchart illustrating a series of processing executed by the operation unit on which the infrared-type touch panel 211 is arranged. Content and conditions of the processing will be described below. The touch panel control unit 204 executes control described in this flowchart.

A procedure of processing in FIG. 7 is started when the image forming apparatus 10 is turned on, and an image, e.g., a user authentication screen or a home screen, is displayed on the display unit 209.

In step S101, in a case where the touch panel control unit 204 receives a notification indicating a state where the detection unit 213 detects interception by the physical object 301 of an invisible light beam emitted from the light-emitting element to the light-receiving element on the first layer (YES in step S101), the processing proceeds to step S103.

In step S103, the touch panel control unit 204 instructs the display unit 209 to display a pointer. Then, the processing proceeds to step S104.

In a case where the invisible light beam on the first layer is not intercepted (NO in step S101), the processing proceeds to step S102. In step S102, the touch panel control unit 204 causes the display unit 209 to display no pointer. Herein, "displaying no pointer" refers to a state where a hidden state of the pointer is maintained or a displayed state of the pointer is shifted to a hidden state.

In step S104, the display unit 209 receives the instruction for displaying a pointer and displays a pointer 318. Then the processing proceeds to step S105. In a case where the pointer 318 has already been displayed on the display unit 209, the displayed state of the pointer 318 is maintained.

In step S105, in a case where the touch panel control unit 204 receives a notification indicating a state where the detection unit 213 detects interception by the physical object 301 of an invisible light beam emitted from the light-emitting element to the light-receiving element on the second layer (YES in step S105), the processing proceeds to step S106. In step S105, in a case where the touch panel control unit 204 does not receive a notification indicating a state where the detection unit 213 detects interception by the physical object 301 of an invisible light beam emitted from the light-emitting element to the light-receiving element on the second layer (NO in step S105), the processing returns to step S101.

In step S106, the touch panel control unit 204 acquires coordinates of the light-receiving element, at which the interception has occurred, from the memory unit 215, and instructs the display unit 209 to invert color of a point corresponding to the coordinates. Then, the processing proceeds to step S107.

In step S107, the display unit 209 inverts the color of the point corresponding to the coordinates. Then, the processing proceeds to step S108.

In step S108, the touch panel control unit 204 determines that the color inverted point corresponding to the coordinates is a position decided by the user, i.e., the touch panel control unit 204 determines that a touch operation is performed by the user. Then, the processing proceeds to step S109.

In step S109, in a case where the touch panel control unit 204 receives a notification indicating a state where the detection unit 213 detects interception by the physical object 301 of an invisible light beam emitted from the light-emitting element to the light-receiving element on the third layer (YES in step S109), the processing proceeds to step S110. In step S109, in a case where the touch panel control unit 204 does not receive a notification indicating a state where the detection unit 213 does not detect interception by the physical object 301 of an invisible light beam emitted from the light-emitting element to the light-receiving element on the third layer (NO in step S109), the processing returns to step S101.

In step S110, the touch panel control unit 204 instructs the display unit 209 and the microcomputer 202 to issue warnings. Then, the processing proceeds to step S111.

In step S111, as an operation for issuing a warning, the display unit 209 changes a background color and displays a warning message, and the microcomputer 202 outputs a warning sound. In step S111, an input by the user is not prohibited. This is because the user intentionally moves the finger to execute a touch operation. Specifically, in step S111, when the invisible light beam on the third layer is intercepted, the invisible light beam on the second layer is also intercepted, and thus although the warnings are issued, the touch panel control unit 204 determines that the color inverted point is a position decided by the user, by the processing similar to the processing in step S108.

In step S112, in a case where contact between the display unit 209 and the physical object 301 is detected (YES in step S112), the touch panel control unit 204 advances the processing to step S113. In a case where contact between the display unit 209 and the physical object 301 is not detected (NO in step S112), the touch panel control unit 204 returns the processing to step S111.

In step S113, the touch panel control unit 204 registers an ID of the log-in user to track the ID through an information network, such as the Contact-Confirming Application (COCOA) which is a cooperative checking system between users to check contact with a person infected with a coronavirus. Then, the processing proceeds to step S114. In this process, the touch panel control unit 204 may execute control to change an input function to a touch input function which allows a user to input information by physically touching the display unit 209 with a finger. In a case where the input function is changed to the physical-touch input function, a non-contact input function may be turned off for a certain period. In step S114, the touch panel control unit 204 causes the microcomputer 202 to provide a notification of sterilization to the user. This notification of sterilization may be displayed on the display unit 209.

According to the present example embodiment, the operation unit 200 executes control based on a position of the user's finger. This configuration can reduce or prevent incorrect inputs from the user.

In the example illustrated in FIG. 7, the touch panel control unit 204 executes the respective pieces of processing. However, the present example embodiment is not limited thereto. alternatively, the CPU 105 of the controller 100 illustrated in FIG. 14 may be employed.

In a case where the CPU 105 is employed, the processing in FIG. 7 will be executed as follows. In this case, the operation unit 200 internally executes the above-described processing executed by the touch panel control unit 204.

In step S101, in a case where the CPU 105 receives a notification indicating a state where the detection unit 213 detects interception by the physical object 301 of an invisible light beam emitted from the light-emitting element to the light-receiving element on the first layer, from the operation unit 200 (YES in step S101), the processing proceeds to step S103.

In step S103, the CPU 105 instructs the operation unit 200 to display a pointer. Then, the processing proceeds to step S104.

In a case where the invisible light beam on the first layer is not intercepted (NO in step S101), the processing proceeds to step S102. In step S102, the CPU 105 causes the operation unit 200 to display no pointer. Herein, "displaying no pointer" refers to a state where a hidden state of the pointer is maintained or a state where a displayed state of the pointer is shifted to a hidden state.

In step S104, the operation unit 200 receives the instruction for displaying a pointer and displays the pointer 318. Then, the processing proceeds to step S105. In a case where the pointer 318 has already been displayed on the display unit 209, a displayed state of the pointer 318 is maintained.

In step S105, in a case where the CPU 105 receives a notification indicating a state where the detection unit 213 detects interception by the physical object 301 of an invisible light beam emitted from the light-emitting element to the light-receiving element on the second layer (YES in step S105), the processing proceeds to step S106. In step S105, in a case where the CPU 105 does not receive a notification indicating a state where the detection unit 213 detects interception by the physical object 301 of an invisible light beam emitted from the light-emitting element to the light-receiving element on the second layer (NO in step S105), the processing returns to step S101.

In step S106, the CPU 105 acquires coordinates of the light-receiving element at which interception has occurred, from the operation unit 200, and instructs the operation unit 200 to invert color of a point corresponding to the coordinates. Then, the processing proceeds to step S107.

In step S107, the CPU 105 instructs the operation unit 200 to invert the color of the point corresponding to the coordinates. Then, the processing proceeds to step S108. In step S108, the CPU 105 determines that the color inverted point corresponding to the coordinates is a position decided by the user, i.e., the CPU 105 determines that a touch operation is performed by the user. Then, the processing proceeds to step S109.

In step S109, in a case where the CPU 105 receives a notification indicating a state where the detection unit 213 detects interception by the physical object 301 of an invisible light beam emitted from the light-emitting element to the light-receiving element on the third layer (YES in step S109), the processing proceeds to step S110. In step S109, in a case where the CPU 105 does not receive a notification indicating a state where the detection unit 213 detects interception by the physical object 301 of an invisible light beam emitted from the light-emitting element to the light-receiving element on the third layer (NO in step S109), the processing returns to step S101.

In step S110, the CPU 105 transmits an instruction for issuing warnings to the display unit 209 and the microcomputer 202. Then, the processing proceeds to step S111.

In step S111, the touch panel control unit 204 causes the display unit 209 to change a background color and display a warning message, and causes the microcomputer 202 to output a warning sound, as operation for issuing warnings.

In step S112, in a case where contact between the display unit 209 of the operation unit 200 and the physical object 301 is detected (YES in step S112), the CPU 105 advances the processing to step S113. In a case where contact between the display unit 209 and the physical object 301 is not detected (NO in step S112), the CPU 105 returns the processing to step S111.

In step S113, the CPU 105 registers an ID of the log-in user to track the ID through an information network, such as "COCOA" which is a cooperative checking system between users to check contact with a person infected with a coronavirus. Then, the processing proceeds to step S114. In step S114, the CPU 105 causes the operation unit 200 to provide a notification of sterilization to the user. This notification of sterilization may be displayed on the display unit 209.

A second example embodiment will be described using a case where a capacitance-type touch panel is used as the non-contact touch panel 210. The same reference numeral is applied to an element similar to that of the first example embodiment, and redundant descriptions thereof will be omitted.

Figure 8A:
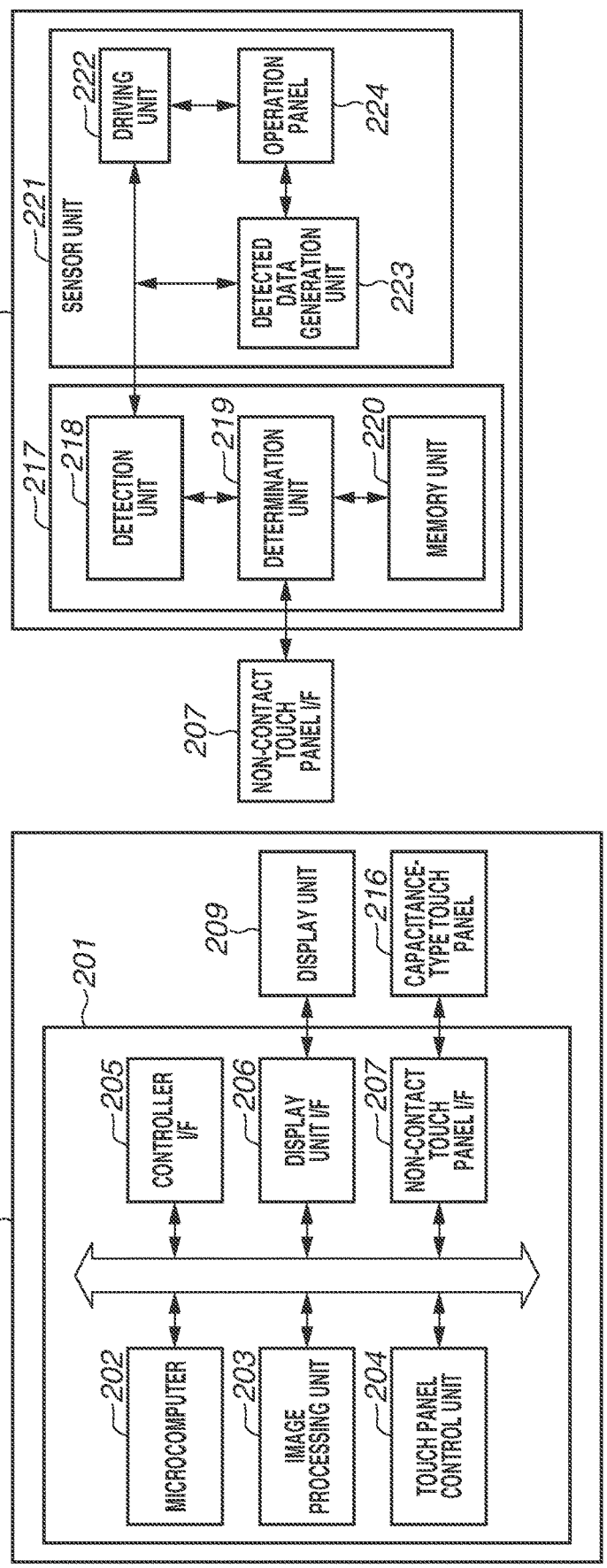
FIGS. 8A and 8B are block diagrams illustrating a configuration of an operation unit including a capacitance-type touch panel according to one embodiment.
Figure 8B:
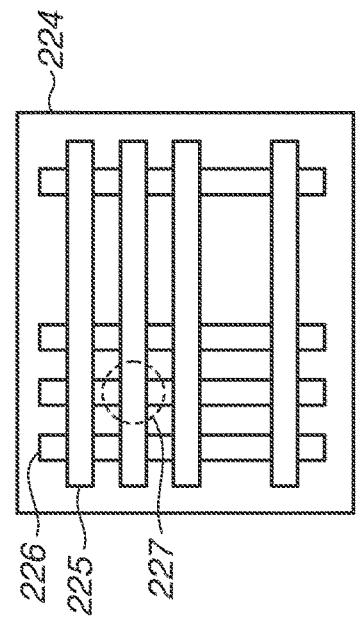

FIGS. 8A and 8B are block diagrams illustrating a hardware configuration of an operation unit including a capacitance-type touch panel 216. Because the elements except for the capacitance-type touch panel 216 are similar to those illustrated in FIGS. 2A and 2B, redundant descriptions thereof will be omitted.

First, FIG. 8A will be described. An operation unit 200 includes the capacitance-type touch panel 216. A touch panel control unit 204 acquires coordinate data from the capacitance-type touch panel 216 and communicates with a controller via a controller OF 205.

The capacitance-type touch panel 216 is disposed over the top of a display unit 209. The capacitance-type touch panel 216 receives an input when a user selects an operation key displayed on the display unit 209. The capacitance-type touch panel 216 includes a control unit 217 and a sensor unit 221. The control unit 217 includes a detection unit 218, a determination unit 219, and a memory unit 220.

The sensor unit 221 includes a driving unit 222, a detected data generation unit 223, and an operation panel 224. The detection unit 218 controls the sensor unit 221 to periodically execute detection at each detection position on the operation panel 224, i.e., periodically execute detection at intersection points where sensor elements 227 of a capacitance type are formed. The above control includes control of an application timing of voltage and a level of voltage applied to an electrode Ey 226 from the driving unit 222 and control of a reading timing of the detected data generation unit 223 of detected data from the electrode Ey 226.

Based on the detected data received from the sensor unit 221 via the detection unit 218, the determination unit 219 stores an amount of change in capacitance of each detection position on the operation panel 224 in the memory unit 220.

Coordinates of a sensor element, reference value data indicating a capacitance, and thresholds are stored in the memory unit 220. Specifically, the thresholds include a threshold T1 for displaying of a pointer, a threshold T2 for determination of a touch operation, and a threshold T3 for issuing of a warning.

The operation panel 224 will be described with reference to FIG. 8B. The operation panel 224 is used as a user interface for receiving an input. The operation panel 224 includes a plurality of electrodes Ex 225 disposed along a first direction (e.g., X-direction) and a plurality of electrodes Ey 226 disposed along a second direction (e.g., Y-direction) orthogonal to the first direction. The electrodes Ex 225 and the electrodes Ey 226 intersect with each other in a mutually-insulated state, and the sensor elements 227 of a capacitance type are formed in the vicinities of intersection points of the electrodes Ex 225 and the electrodes Ey 226.

An arrangement pattern of the electrodes Ex 225 and the electrodes Ey 226 is not limited to a grid pattern, but can be any optional pattern, such as a diamond pattern (i.e., rhombic pattern), as long as the electrodes Ex 225 and the electrodes Ey 226 intersect with each other. The driving unit 222 applies driving voltage to each of the sensor elements 227. For example, according to the control executed by the detection unit 218, the driving unit 222 sequentially selects a plurality of electrodes Ex 225 to apply voltage that changes periodically to the selected electrodes Ex 225.

Because of the application of voltage, potential of the sensor element 227 is changed and thus electric discharge/charge occurs. A capacitance of the sensor element 227 is detected by detecting a charge amount at the electrode Ey 226. The electrode Ey 226 supplies a capacitance detected at each of intersection points of a corresponding row to the detected data generation unit 223. The detected data is, for example, digital data of voltage values digitally sampled based on the capacitance of each of the intersection points. The detected data is supplied to the detection unit 218.

Figure 9:
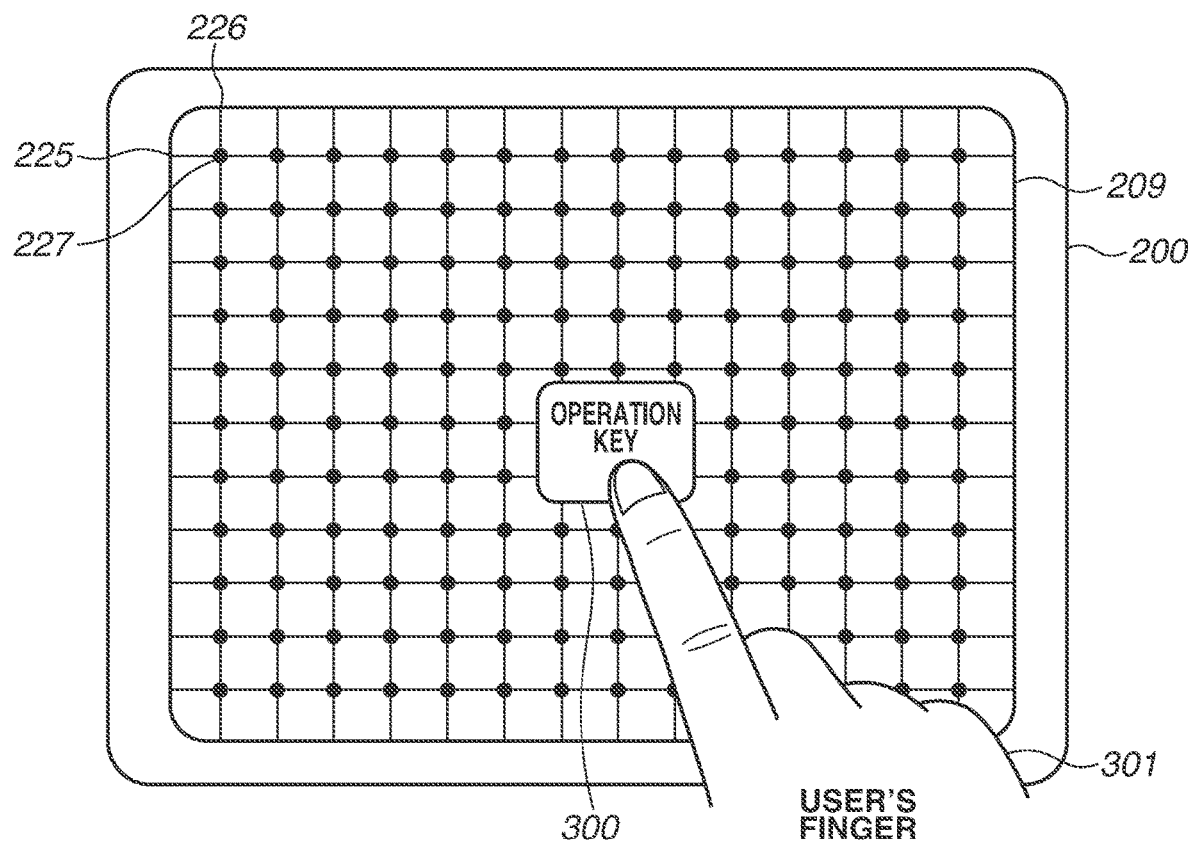
FIG. 9 is an overhead view illustrating a state where a user moves a physical object close to the capacitance-type touch panel to select an operation key according to one embodiment.

FIG. 9 is a diagram illustrating a state where the user selects an operation key 300 displayed on the display unit 209 on which the capacitance-type touch panel 216 is disposed. When the user's finger as a physical object 301 moves toward an operation key 300, the electrode Ey 226 detects a capacitance of a sensor element 227 in an area where the operation key 300 is arranged. The detected data is supplied to the control substrate 201.

Examples of the operation key 300 is similar to the above-described examples of the operation key 300.

FIG. 10 is a diagram illustrating a change in capacitance of the sensor element 227 on the capacitance-type touch panel 216. The capacitance-type touch panel 216 includes electrodes Ex 225 extending in the X-direction and electrodes Ey 226 extending in the Y-direction. Capacitance is generated at each of intersection points between the electrodes Ex 225 and the electrodes Ey 226, and a capacitance of the sensor element 227 is changed. For example, the electrode Ex 225 can be used as a driving electrode, and the electrode Ey 226 can be used as a detection electrode.

By applying periodically changing voltage to the electrode Ex 225 of the capacitance-type touch panel 216, potential of the sensor element 227 is changed and thus electric discharge/charge occurs. A capacitance of the sensor element 227 can be detected by detecting a capacitance at the electrode Ey 226. For example, when a finger as the physical object 301 moves close to the operation panel 224, the capacitance of the sensor element 227 is changed (increased) remarkably because of capacitance coupling between the physical object 301 and the electrode Ey 226. On the contrary, when the physical object 301 moves away from the operation panel 224, the capacitance of the sensor element 227 is changed (decreased) because capacitance coupling between the physical object 301 and the electrode Ey 226 does not occur.

With reference to FIGS. 11A to 11D, a description will be given of operation of detecting the threshold T1 for displaying of a pointer, the threshold T2 for determination of a touch operation, and the threshold T3 for issuing of a warning, in the capacitance-type touch panel 216 disposed on the operation unit 200. For example, as illustrated in FIGS. 11A and 11B, a finger as the physical object 301 moves close to the operation panel 224. In a case where the determination unit 219 determines that a detected capacitance of the sensor element 227 exceeds the threshold T1 stored in the memory unit 220, the control unit 217 transmits a notification to prompt the control substrate 201 to display a pointer. The touch panel control unit 204 receives the notification and transmits an instruction for displaying a pointer on a point corresponding to the coordinates to the display unit 209.

Next, as illustrated in FIGS. 11B and 11C, the finger as the physical object 301 moves closer to the operation panel 224. In a case where the determination unit 219 determines that a detected capacitance of the sensor element 227 exceeds the threshold T2 stored in the memory unit 220, the control unit 217 transmits a notification to prompt the control substrate 201 to perform processing in response to a touch operation performed on the point corresponding to the coordinates on which the pointer is displayed. The microcomputer 202 receives the notification via the touch panel control unit 204 and performs the processing in response to the touch operation.

Subsequently, as illustrated in FIGS. 11C and 11D, the finger as the physical object 301 further moves closer to the operation panel 224. In a case where the determination unit 219 determines that a detected capacitance of the sensor element 227 exceeds the threshold T3 stored in the memory unit 220, the control unit 217 transmits a notification to prompt the control substrate 201 to issue a warning.

The touch panel control unit 204 receives the notification and displays a warning message on the display unit 209.

With reference to FIGS. 12A to 12D, a description will be given of operation of detecting the threshold T1 for displaying of a pointer, the threshold T2 for determination of a touch operation, and the threshold T3 for issuing of a warning, in the capacitance-type touch panel 216 disposed on the operation unit 200. FIG. 12A illustrates a state where a capacitance of the sensor element 227 does not reach the threshold T1 when the physical object 301 is at a position illustrated in FIG. 12A.

FIG. 12B illustrates a state where the finger as the physical object 301 moves close to the operation panel 224, and the determination unit 219 determines that a detected capacitance of the sensor element 227 exceeds the threshold T1 stored in the memory unit 220. The display unit 209 displays a pointer 318, and the pointer 318 is moved in accordance with a point corresponding to the coordinates.

FIG. 12C illustrates a state where the determination unit 219 determines that a detected capacitance of the sensor element 227 exceeds the threshold T2 stored in the memory unit 220. The display unit 209 displays that a touch operation with respect to the operation key 300 on which the pointer 318 is displayed is performed. For example, the display unit 209 inverts color of the operation key 300.

FIG. 12D illustrates a state where the determination unit 219 determines that a detected capacitance of the sensor element 227 exceeds the threshold T3 stored in the memory unit 220. The display unit 209 changes a background color of display to another color (e.g., red color) different from a standard color, and the operation unit 200 outputs a warning sound.

Figure 13:
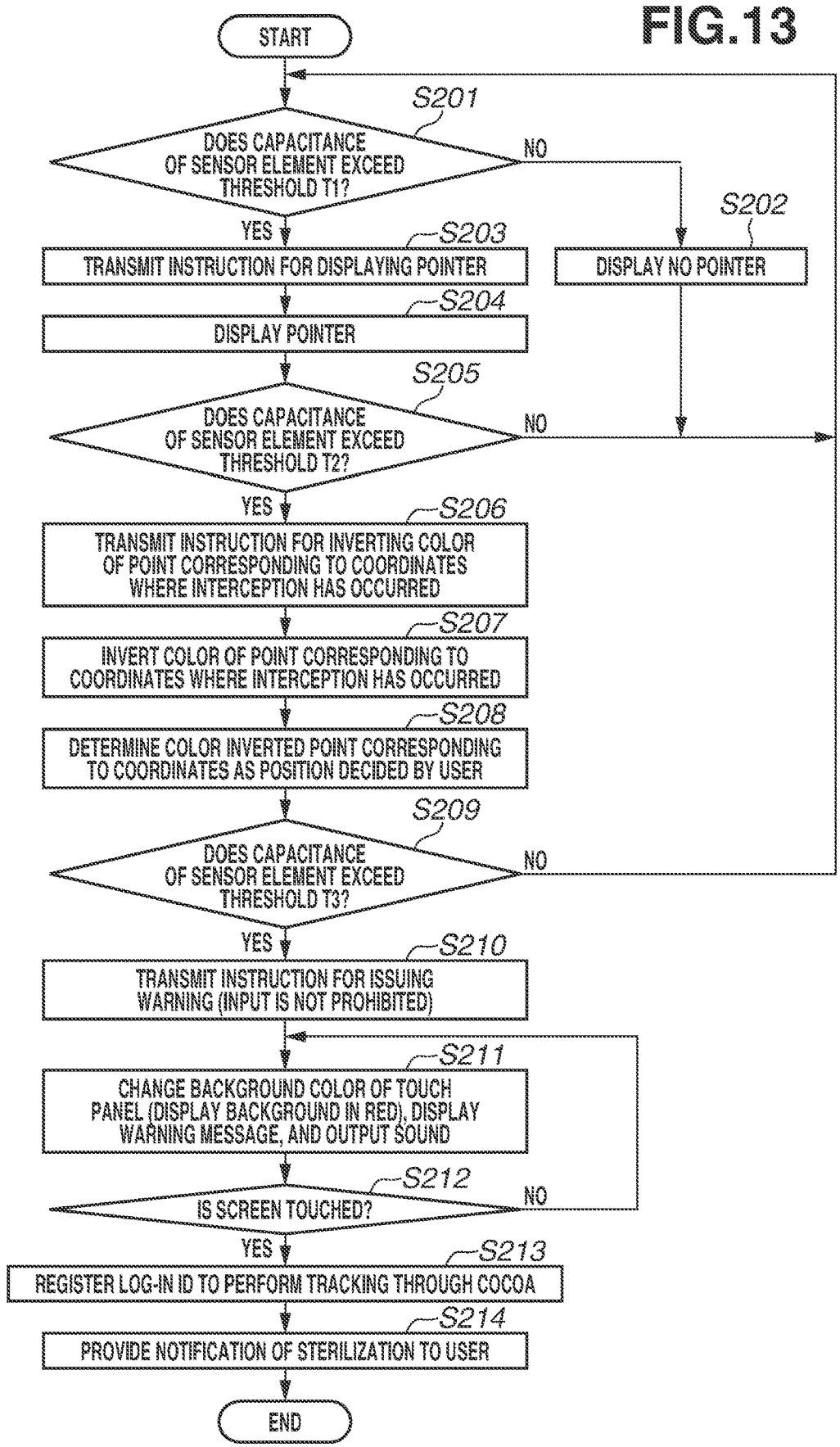
FIG. 13 is a flowchart illustrating processing to be executed when thresholds are set for capacitance of the capacitance-type touch panel according to one embodiment.

FIG. 13 is a flowchart illustrating a series of processing executed in the operation unit on which the capacitance-type touch panel 216 is arranged. A procedure and conditions of the processing will be described below. The touch panel control unit 204 executes control described in this flowchart.

A procedure of processing in FIG. 13 is started when the image forming apparatus 10 is turned on, and an image, such as a user authentication screen and a home screen, is displayed on the display unit 209.

In step S201, the touch panel control unit 204 determines whether a capacitance of the sensor element 227 exceeds the threshold T1 by the physical object 301 moving close to the operation panel 224. In a case where the capacitance exceeds the threshold T1 (YES in step S201), the processing proceeds to step S203. In step S201, in a case where the capacitance does not exceed the threshold T1 (NO in step S201), the processing proceeds to step S202.

In step S202, the touch panel control unit 204 causes the display unit 209 to display no pointer. The processing returns to step S201 when the processing in step S202 is ended. The determination in step S201 may be executed by the microcomputer 202.

In step S203, the touch panel control unit 204 instructs the display unit 209 to display a pointer. Then, the processing proceeds to step S204.

In step S204, the display unit 209 receives the instruction for displaying a pointer and displays the pointer 318. Then the processing proceeds to step S205.

In step S205, the touch panel control unit 204 determines whether a capacitance of the sensor element 227 exceeds the threshold T2. In a case where the capacitance exceeds the threshold T2 (YES in step S205), the processing proceeds to step S206. In step S205, In a case where the capacitance of the sensor element 227 does not exceed the threshold T2 (NO in step S205), the processing returns to step S201. The determination in step S205 may be executed by the microcomputer 202.

In step S206, the touch panel control unit 204 acquires coordinates of the sensor element 227 from the memory unit 220, and instructs the display unit 209 to invert color of a point corresponding to the coordinates. Then, the processing proceeds to step S207.

In step S207, the display unit 209 receives the instruction for inverting the color of the point corresponding to the coordinates, and inverts the color of the point corresponding to the coordinates. Then, the processing proceeds to step S208.

In step S208, the touch panel control unit 204 determines that the color inverted point corresponding to the coordinates is a position decided by the user, i.e., the touch panel control unit 204 determines that a touch operation is performed by the user. Then, the processing proceeds to step S209. The determination in step S208 may be executed by the microcomputer 202.

In step S209, the touch panel control unit 204 determines whether a capacitance of the sensor element 227 exceeds the threshold T3. In a case where the capacitance exceeds the threshold T3 (YES in step S209), the processing proceeds to step S210. The processing proceeds to step S211 when the processing in step S210 is ended. On the other hand, In a case where the capacitance does not exceed the threshold T3 (NO in step S209), the processing returns to step S201. The determination in step S209 may be executed by the microcomputer 202.

In step S210, the touch panel control unit 204 instructs the display unit 209 and the microcomputer 202 to issue warnings. In step S211, as operation for issuing warnings, the display unit 209 changes a background color of display and displays a warning message. Further, the touch panel control unit 204 causes the microcomputer 202 to output a warning sound. The processing proceeds to step S212 when the processing in step S211 is ended.

In step S212, the touch panel control unit 204 determines whether the physical object 301 is in contact with the display unit 209. In a case where the physical object 301 is in contact with the display unit 209 (YES in step S212), the processing proceeds to step S213. In step S213, the touch panel control unit 204 registers an ID of the log-in user to track the ID through an information network, such as "COCOA" which is a cooperative check system between users to check contact with a person infected with a coronavirus. Then, the processing proceeds to step S214. In step S214, the touch panel control unit 204 provides a notification of sterilization to the user. This notification of sterilization may be displayed on the display unit 209.

In the example illustrated in FIG. 13, the touch panel control unit 204 executes the above-described pieces of processing. However, the present example embodiment is not limited thereto. Alternatively, the CPU 105 of the controller 100 illustrated in FIG. 14 may be employed. In a case where the CPU 105 is employed, the processing in FIG. 13 will be executed as follows. In this case, the operation unit 200 internally executes the above-described operation executed by the touch panel control unit 204.

In step S201, the CPU 105 determines whether a capacitance of the sensor element 227 exceeds the threshold T1 by the physical object 301 moving close to the operation panel 224. In a case where the capacitance exceeds the threshold T1 (YES in step S201), the processing proceeds to step S203. In step S201, in a case where the capacitance does not exceed the threshold T1 (NO in step S201), the processing proceeds to step S202.

In step S202, the CPU 105 causes the operation unit 200 to display no pointer. The processing returns to step S201 when the processing in step S202 is ended.

In step S203, the CPU 105 instructs the operation unit 200 to display a pointer. Then, the processing proceeds to step S204.

In step S204, the operation unit 200 displays the pointer 318 on the display unit 209. Then the processing proceeds to step S205.

In step S205, the CPU 105 determines whether a capacitance of the sensor element 227 exceeds the threshold T2. In a case where the capacitance exceeds the threshold T2 (YES in step S205), the processing proceeds to step S206. In step S205, in a case where the capacitance of the sensor element 227 does not exceed the threshold T2 (NO in step S205), the processing returns to step S201.

In step S206, the CPU 105 acquires coordinates of the sensor element 227 from the memory unit 220, and instructs the operation unit 200 to invert color of a point corresponding to the coordinates. Then, the processing proceeds to step S207.

In step S207, the operation unit 200 receives the instruction for inverting the color of the point corresponding to the coordinates, and causes the display unit 209 to invert the color of the point corresponding to the coordinates. Then, the processing proceeds to step S208.

In step S208, the touch panel control unit 204 determines that the color inverted point corresponding to the coordinates is a position decided by the user, i.e., the touch panel control unit 204 determines that a touch operation is performed by the user. Then, the processing proceeds to step S209.

In step S209, the CPU 105 determines whether a capacitance of the sensor element 227 exceeds the threshold T3. In a case where the capacitance exceeds the threshold T3 (YES in step S209), the processing proceeds to step S210. The processing proceeds to step S211 when the processing in step S210 is ended. On the other hand, in a case where the capacitance does not exceed the threshold T3 (NO in step S209), the processing proceeds to step S201.

In step S210, the CPU 105 instructs the operation unit 200 to issue warnings. In step S211, as operation for issuing warnings, the operation unit 200 changes a background color of display, displays a warning message, and outputs a warning sound. The processing proceeds to step S212 when the processing in step S211 is ended.

In step S212, the CPU 105 determines whether the physical object 301 is in contact with the operation unit 200. In a case where the physical object 301 is in contact with the operation unit 200 (YES in step S212), the processing proceeds to step S213. In step S213, the CPU 105 registers an ID of the log-in user to track the ID through an information network, such as "COCOA" which is a cooperative checking system between users to check contact with a person infected with a coronavirus. Then, the processing proceeds to step S214. In step S214, the CPU 105 provides a notification of sterilization to the user. This notification of sterilization may be displayed on the operation unit 200.

In the first and the second example embodiments, the non-contact type touch panels have been taken as examples. However, application of the configurations according to the first and the second example embodiments is not limited to the above described non-contact type touch panels, but to a system in which an operation unit is projected in the air, or an input is executed through a gesture motion. In both of the cases, a warning may be issued in a case where a user excessively moves the finger in an input direction.

Although various example embodiments of the present disclosure have been described as the above, the spirit and the scope of the present invention are not limited to specific descriptions of the present specification.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-009131, filed Jan. 22, 2021, which is hereby incorporated by reference herein in its entirety.

What is claimed is:

1. An apparatus comprising:
   an operation unit configured to detect a position of an object being present perpendicular to a screen and receive, in a case where the position of the object being present perpendicular to the screen satisfies a first condition, a non-contact input based on the position of the object,
   wherein the operation unit displays a pointer corresponding to the position of the object in a case where the object is recognized at a first reaction position perpendicular to the screen, the operation unit determines an item corresponding to a position of the pointer in a case where the object is recognized at a second reaction position perpendicular to the screen and closer to the screen than the first reaction position, and the operation unit issues a warning for preventing a contact with the screen in a state where the item remains selectable in a case where the object is recognized at a third reaction position perpendicular to the screen and closer to the screen than the second reaction position.

2. The apparatus according to claim 1, wherein the screen is included in the operation unit and the warning is displayed on the screen.

3. The apparatus according to claim 1, wherein the warning is a warning sound output by the operation unit.

4. The apparatus according to claim 1, wherein the warning is a change of color of a background displayed on the screen.

5. The apparatus according to claim 4, wherein the determined item is displayed with another color being different from the color of the background.

6. The apparatus according to claim 1, wherein in a case where the operation unit detects that the object comes into contact with the screen, a notification of sterilization which prompts a user to sterilize the screen is displayed on the screen.

7. The apparatus according to claim 1, further comprising:
an authentication unit configured to authenticate a user, and
a storage unit configured to store, in a state where the user is authenticated by the authentication unit and in a case where the operation unit detects that the object comes into contact with the screen, information about the authenticated user.

8. The apparatus according to claim 1, further comprising:
a control unit configured to control the apparatus in accordance with an operation which is instructed by the operation unit,
wherein in a case where a second condition is satisfied, the control unit executes an input in accordance with the item determined by the operation unit.

9. The apparatus according to claim 8,
wherein the operation unit is an infrared-type detection device having three rows of infrared sensor elements disposed in a direction perpendicular to the screen,
wherein the first reaction position is a position to be detected by sensor elements disposed farthest from the screen in the perpendicular direction among the three rows of sensor elements,
wherein the second reaction position is a position to be detected by sensor elements disposed in a middle row among the three rows of sensor elements, and
wherein the third reaction position is a position to be detected by sensor elements disposed closest to the screen in the perpendicular direction among the three rows of sensor elements.

10. The apparatus according to claim 8,
wherein the operation unit is a capacitance-type detection device which detects a position of an object with respect to the screen based on capacitance generated between the screen and the object,
wherein the first reaction position is a position at which the capacitance satisfies a condition with respect to a first threshold,
wherein the second reaction position is a position at which the capacitance satisfies a condition with respect to a second threshold greater than the first threshold, and
wherein the third reaction position is a position at which the capacitance satisfies a condition with respect to a third threshold greater than the second threshold.

11. The apparatus according to claim 1, wherein in a case where the operation unit detects that the object comes into contact with the screen, the operation unit switches an input function of the screen to a touch-input function.

12. The apparatus according to claim 11, wherein in a case where the input function of the screen is switched to the touch-input function, a non-contact input function of the apparatus is turned off for a certain period of time.

13. The apparatus according to claim 1, further comprising a printer configured to print an image on a sheet,
wherein the screen is a screen for performing a printing function of the apparatus.

14. The apparatus according to claim 13, wherein the item is an item for designating a double-sided printing.

15. The apparatus according to claim 13, wherein the printing function is a copy printing function.

16. A control method of an apparatus that includes an operation unit which receives, in a case where a position of an object being present perpendicular to a screen satisfies a first condition, a non-contact input based on the position of the object, the control method comprising:
detecting a position of the object being present perpendicular to the screen, and
displaying a pointer corresponding to the position of the object, in a case where the object is recognized at a first reaction position perpendicular to the screen, determining an item corresponding to a position of the pointer in a case where the object is recognized at a second reaction position perpendicular to the screen and closer to the screen than the first reaction position, and issuing a warning for preventing contact with the screen in a state where the item remains selectable in a case where the object is recognized at a third reaction position perpendicular to the screen and closer to the screen than the second reaction position.

* * * * *